(12) United States Patent
Limberg

(10) Patent No.: US 6,188,441 B1
(45) Date of Patent: Feb. 13, 2001

(54) DETECTION OF PN SEQUENCES ACCOMPANYING VSB SIGNAL TO CONTROL OPERATING MODE OF QAM/VSB DTV SIGNAL RECEIVER

(75) Inventor: Allen LeRoy Limberg, Vienna, VA (US)

(73) Assignee: Samsung Electronics Co., Ltd., Suwon (KR)

(*) Notice: Under 35 U.S.C. 154(b), the term of this patent shall be extended for 0 days.

(21) Appl. No.: 09/229,602

(22) Filed: Jan. 13, 1999

Related U.S. Application Data

(60) Provisional application No. 60/077,100, filed on Mar. 6, 1998.

(51) Int. Cl.[7] .............................. H04N 5/46; H04N 5/21; H04N 5/44

(52) U.S. Cl. .......................... 348/555; 348/614; 348/725; 348/726

(58) Field of Search ..................... 348/729, 725, 348/607, 614, 611, 558, 726, 555, 470, 21; 375/346, 348, 350; H04N 5/44, 5/21, 5/46

(56) References Cited

U.S. PATENT DOCUMENTS

| | | | |
|---|---|---|---|
| 5,479,449 | * 12/1995 | Patel | 375/316 |
| 5,506,636 | * 4/1996 | Patel | 348/725 |
| 5,548,617 | * 8/1996 | Patel | 375/316 |
| 5,604,541 | * 2/1997 | Kim | 348/426 |
| 5,715,012 | * 2/1998 | Patel | 348/555 |
| 5,731,848 | * 3/1998 | Patel | 348/614 |
| 5,835,131 | * 11/1998 | Limberg | 348/21 |
| 5,877,816 | * 3/1999 | Kim | 348/526 |
| 5,886,748 | * 3/1999 | Lee | 348/614 |

* cited by examiner

Primary Examiner—Sherrie Hsia
(74) Attorney, Agent, or Firm—Robert E. Bushnell, Esq.

(57) ABSTRACT

The data field synchronization segment as symbol coded for VSB transmission comprises pseudo-random noise (PN) sequence information that can be detected using a match filter in a QAM/VSB DTV signal receiver. The data field synchronization segment as symbol coded for QAM transmission does not contain the PN sequence information that can be detected using the same match filter used for detecting the PN sequence information in the VSB transmission. A threshold detector is used for determining whether the match filter response is of sufficient energy to indicate occurrence in a received DTV signal of the PN sequence information in the data field synchronization segment of a VSB DTV transmission. Timed latch circuitry is used for latching the indication for a period of time longer than at least one DTV data field. The QAM/VSB DTV signal receiver is operated either in a QAM reception mode or in a VSB reception mode, depending on the output signal of the timed latch circuitry.

21 Claims, 10 Drawing Sheets

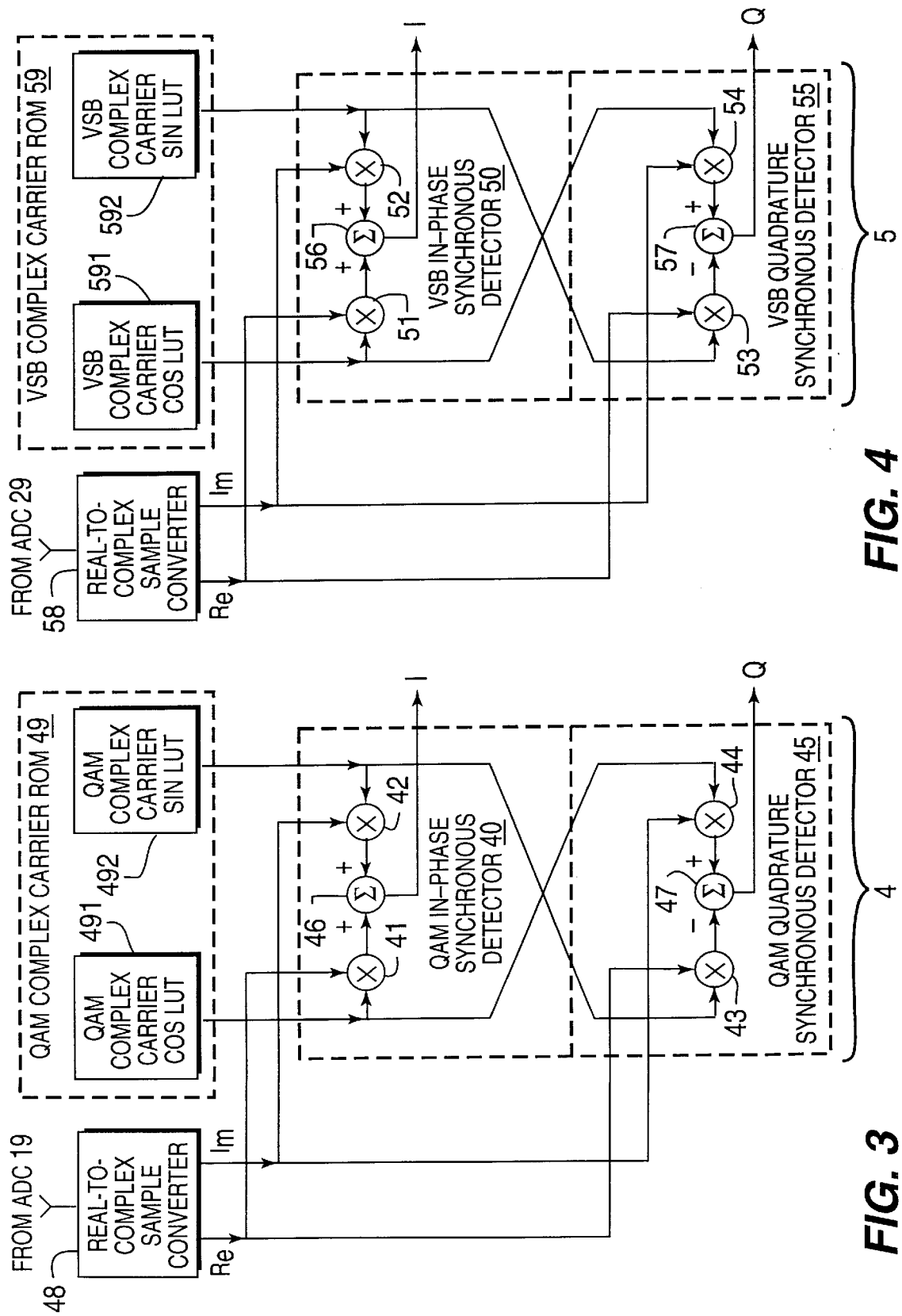

DETECTION OF PN SEQUENCES ACCOMPANYING VSB SIGNAL TO CONTROL OPERATING MODE OF QAM/VSB DTV SIGNAL RECEIVER

This application is filed under 35 U.S.C. 111(a) claiming pursuant to 35 U.S.C. 119(e)(1) benefit of the filing date of provisional application Ser. No. 60/077,100 filed Mar. 6, 1998, pursuant to 35 U.S.C. 111(b).

The invention relates to radio receivers having the capability of receiving digital television (DTV) signals such as digital high-definition television (HDTV) signals, transmitted using quadrature amplitude modulation (QAM) of the principal carrier wave or transmitted using vestigial sideband (VSB) amplitude modulation of the principal carrier wave.

BACKGROUND OF THE INVENTION

A Digital Television Standard published Sep. 16, 1995 by the Advanced Television Systems Committee (ATSC) specifies vestigial sideband (VSB) signals for transmitting digital television (DTV) signals in 6-MHz-bandwidth television channels such as those currently used in over-the-air broadcasting of National Television System Committee (NTSC) analog television signals within the United States. The VSB DTV signal is designed so its spectrum is likely to interleave with the spectrum of a co-channel interfering NTSC analog TV signal. This is done by positioning the pilot carrier and the principal amplitude-modulation sideband frequencies of the DTV signal at odd multiples of one-quarter the horizontal scan line rate of the NTSC analog TV signal that fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal is offset from such video carrier by 59.75 times the horizontal scan line rate of the NTSC analog TV signal, to place the carrier of the DTV signal about 309,877.6 Hz from the lower limit frequency of the television channel. Accordingly, the carrier of the DTV signal is about 2,690122.4 Hz from the middle frequency of the television channel. The exact symbol rate in the Digital Television Standard is (684/286) times the 4.5 MHz sound carrier offset from video carrier in an NTSC analog TV signal. The number of symbols per horizontal scan line in an NTSC analog TV signal is 684, and 286 is the factor by which horizontal scan line rate in an NTSC analog TV signal is multiplied to obtain the 4.5 MHz sound carrier offset from video carrier in an NTSC analog TV signal. The symbol rate is $10.762238*10^6$ symbols per second, which can be contained in a VSB signal extending 5.381119 MHz from DTV signal carrier. That is, the VSB signal can be limited to a band extending 5.690997 MHz from the lower limit frequency of the television channel.

The ATSC standard for digital HDTV signal terrestrial broadcasting in the United States of America is capable of transmitting either of two high-definition television (HDTV) formats with 16:9 aspect ratio. One HDTV format uses 1920 samples per scan line and 1080 active horizontal scan lines per 30 Hz frame with 2:1 field interlace. The other HDTV format uses 1280 luminance samples per scan line and 720 progressively scanned scan lines of television image per 60 Hz frame. The ATSC standard also accommodates the transmission of DTV formats other than HDTV formats, such as the parallel transmission of four television signals having normal definition in comparison to an NTSC analog television signal.

DTV transmitted by vestigial-sideband (VSB) amplitude modulation (AM) for terrestrial broadcasting in the United States of America comprises a succession of consecutive-in-time data fields each containing 313 consecutive-in-time data segments. There are 832 symbols per data segment. So, with the symbol rate being 10.76 MHz, each data segment is of 77.3 microseconds duration. Each segment of data begins with a line synchronization code group of four symbols having successive values of +S, −S, −S and +S. The value +S is one level below the maximum positive data excursion, and the value −S is one level above the maximum negative data excursion. The initial line of each data field includes a field synchronization code group that codes a training signal for channel-equalization and multipath suppression procedures. The training signal is a 511-sample pseudo-noise sequence (or "PN-sequence") followed by three 63-sample PN sequences. The middle one of these 63-sample PN sequences is transmitted in accordance with a first logic convention in the first line of each odd-numbered data field and in accordance with a second logic convention in the first line of each even-numbered data field, the first and second logic conventions being one's complementary respective to each other. The other two 63-sample PN sequences and the 511-sample PN sequence are transmitted in accordance with the same logic convention in all data fields.

The remaining lines of each data field contain data that have been Reed-Solomon forward error-correction coded after having been randomized and subjected to diagonal byte interleaving. In over-the-air broadcasting the error-correction coded data are then trellis coded using twelve interleaved trellis codes, each a ⅔ rate punctured trellis code with one uncoded bit. Trellis coding results are parsed into three-bit groups for over-the-air transmission in eight-level one-dimensional-constellation symbol coding, which transmission is made without symbol pre-coding separate from the trellis coding procedure. Trellis coding is not used in cablecasting proposed in the ATSC standard. The error-correction coded data are parsed into four-bit groups for transmission as sixteen-level one-dimensional-constellation symbol coding, which transmissions are made without preceding.

The VSB signals have their natural carrier wave, which would vary in amplitude depending on the percentage of modulation, suppressed. The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 3-bit symbol coding have normalized values of −7, −5, −3, −1, +1, +3, +5 and +7 in the carrier modulating signal, the pilot carrier has a normalized vale of 1.25. The normalized value of +S is +5, and the normalized value of −S is −5.

VSB signals using 8-level symbol coding will be used in over-the-air broadcasting within the United States, and VSB signals using 16-level symbol coding can be used in over-the-air narrowcasting systems or in cable-casting systems. However, certain cable-casting is likely to be done using suppressed-carrier quadrature amplitude modulation (QAM) signals instead, rather than using VSB signals. This has presented television receiver designers with the challenge of designing receivers that are capable of receiving either type of transmission and of automatically selecting suitable receiving apparatus for the type of transmission currently being received.

It is assumed that the data format supplied for symbol encoding is the same in transmitters for the VSB DTV signals and in transmitters for the QAM DTV signals. The VSB DTV signals modulate the amplitude of only one phase of the carrier at symbol rate of $10.76*10^6$ symbols per second to provide a real signal unaccompanied by an imaginary signal, which real signal fits within a 6 MHz band because of its VSB nature with carrier near edge of band. Accordingly, the QAM DTV signals, which modulate two orthogonal phases of the carrier to provide a complex signal comprising a real signal and an imaginary signal as components thereof, are designed to have a symbol rate of $5.38*10^6$ symbols per second, which complex signal fits within a 6 MHz band because of its QAM nature, with carrier at middle of band.

Processing after symbol decoding is similar in receivers for the VSB DTV signals and in receivers for the QAM DTV signals, assuming the data format supplied for symbol encoding is the same in transmitters for the VSB DTV signals and in transmitters for the QAM DTV signals. The data recovered by symbol decoding are supplied as input signal to a data de-interleaver, and the de-interleaved data are supplied to a Reed-Solomon decoder. Error-corrected data are supplied to a data de-randomizer which regenerates packets of data for a packet decoder. Selected packets are used to reproduce the audio portions of the DTV program, and other selected packets are used to reproduce the video portions of the DTV program.

The design of receivers for both QAM and VSB signals in which QAM/VSB receivers both types of signal are processed through the same interrnediate-frequency amplifiers is described by C. B. Patel et alii in U.S. Pat. No. 5,715,012 issued Feb. 3, 1998, entitled RADIO RECEIVERS FOR RECEIVING BOTH VSB AND QAM DIGITAL HDTV SIGNALS and incorporated herein by reference. In a DTV signal receiver as described in U.S. Pat. No. 5,715, 012, the presence or absence of VSB pilot carrier in received DTV signal is detected by a pilot-carrier-presence detector in order to generate a QAM/VSB control signal for determining whether the receiver is to be conditioned for operation in a QAM signal reception mode or is to be conditioned for operation in a VSB signal reception mode. During QAM reception there are frequency components 310 kHz from the lower limit frequency of the television channel arising from amplitude modulation of the mid-channel carrier by symbol code description of data, which frequency components fluctuate as to strength. During VSB reception a pilot carrier is transmitted 310 kHz from the lower limit frequency of the television channel, which pilot carrier is supposed to be of constant strength. So long as the pilot carrier received during VSB reception is of constant strength, it can be distinguished from lower-sideband QAM signal modulation of similar frequency. However, during rapidly changing multipath conditions the pilot carrier received during VSB reception may vary in strength sufficiently to make the presence or absence of VSB pilot carrier in received DTV signal difficult or impossible to ascertain.

C. B. Patel et alii describe an alternative method for generating QAM/VSB control signal in U.S. Pat. No. 5,506, 636 issued Apr. 9, 1996, entitled HDTV SIGNAL RECEIVER WITH IMAGINARY-SAMPLE-PRESENCE DETECTOR FOR QAM/VSB MODE SELECTION, and incorporated herein by reference. In this alternative method the absence of low-modulating-frequency components in quadrature with the pilot carrier frequency is used to determine that VSB signal is being received. The satisfactory operation of the imaginary-sample-presence detector of U.S. Pat. No. 5,506,636 depends on lack of co-channel interfering signal.

In the QAM/VSB radio receivers described in U.S. Pat. Nos. 5,506,636 and 5,715,012 the final intermediate-frequency signal is digitized, and synchrodyne procedures to obtain baseband samples are carried out in the digital regime. A tuner within the receiver includes elements for selecting one of channels at different locations in a frequency band used for transmitting DTV signals, a succession of mixers for performing a plural conversion of signal received in the selected channel to a final intermediate-frequency (IF) signal, a respective frequency-selective amplifier between each earlier one of the mixers in that succession and each next one of said mixers in that succession, and a respective local oscillator for supplying oscillations to each of the mixers. Each of these local oscillators supplies respective oscillations of substantially the same frequency irrespective of whether the selected DTV signal is a QAM signal or is a VSB signal. The final IF signal is digitized, and thereafter there are differences in signal processing depending on whether the selected DTV signal is a QAM signal or is a VSB signal. These differences are accommodated in digital circuitry including QAM synchrodyning circuitry and VSB synchrodyning circuitry. The QAM synchrodyning circuitry generates real and imaginary sample streams of interleaved QAM symbol code, by synchrodyning the digitized final IF signal to baseband providing it is a QAM signal and otherwise processing the digitized final IF signal as if it were a QAM signal to be synchrodyned to baseband. The VSB synchrodyning circuitry generates a real sample stream of interleaved VSB symbol code, by synchrodyning the digitized final IF signal to baseband providing it is a VSB signal and otherwise processing the digitized final IF signal as if it were a VSB signal to be synchrodyned to baseband. A pilot-carrier-presence detector or an imaginary-sample-presence detector determines whether or not the final IF signal is a VSB signal to generate a control signal, which is in a first condition when the final IF signal apparently is not a VSB signal and is in a second condition when the final IF signal apparently is a VSB signal. Responsive to the control signal being in its first condition, the radio receiver is automatically switched to operate in a QAM signal reception mode; and responsive to the control signal being in its second condition, the radio receiver is automatically switched to operate in a VSB signal reception mode. The satisfactory operation of the imaginary-sample-presence detector of U.S. Pat. No. 5,506,636 depends on achieving synchronized detection of the pilot carrier wave accompanying the VSB DTV signal. Satisfactory operation of the pilot-carrier-presence detector of U.S. Pat. No. 5,715,012 also depends on achieving synchronized detection of the pilot carrier wave accompanying the VSB DTV signal. If there is difficulty with synchronizing with a VSB DTV signal, there is possibility of an undesirable lock-out condition wherein the receiver is placed into a QAM reception mode and control of the frequency and phase of the third local oscillator responsive to baseband VSB demodulation is prevented.

The invention seeks to detect the reception of VSB DTV signal so as to be less susceptible to error caused by rapidly changing multi-path reception, co-channel interference, or failure to completely achieve synchronized detection of the pilot carrier wave. The invention depends on the fact that the data field synchronization segment as symbol coded for VSB transmission comprises pseudo-random noise (PN) sequence information that can be detected using a match filter in a television signal radio receiver capable of receiving VSB DTV signals and at least one other type of television signal. Embodiments of the invention in which the other type of television signal is a QAM DTV signal take advantage of the fact that the data field synchronization segment as symbol coded for QAM transmission does not contain the PN sequence information that can be detected using the same match filter used for detecting the PN sequence information in the VSB transmission.

SUMMARY OF THE INVENTION

The invention is embodied in a television signal radio receiver for selectively receiving vestigial-sideband (VSB) digital television (DTV) signals and television signals of at least one other type, each said VSB DTV signal having pseudo-random noise (PN) sequence information in the initial data segment of each successive one of the data fields thereof. The television signal radio receiver comprises circuitry for demodulating VSB DTV signals to generate a baseband signal and a PN sequence presence detector responsive to the baseband signal for detecting the occurrence of the PN sequence information therein when a VSB DTV signal is being received. The PN sequence presence detector provides an output signal with an indication of each such occurrence, which indication is sustained for a period of time at least as long as the duration of a data field. The television signal radio receiver further comprises circuitry for operating the receiver in a VSB DTV reception mode responsive to the PN sequence presence detector providing an output signal with an indication of the occurrence of said PN sequence information in said baseband signal, and for operating the television signal radio receiver in a reception mode for another type of television signal, responsive to said PN sequence presence detector providing an output signal without indication of the occurrence of said PN sequence information in said baseband signal.

The invention in a more particular aspect thereof is embodied in television signal radio receiver in which the PN sequence presence detector comprises match filter circuitry receptive of the baseband signal for providing match filter response to the PN sequence information in the data field synchronization segment of a received VSB DTV transmission, a threshold detector for determining when the match filter response is of sufficient energy to indicate occurrence in a received DTV signal of the PN sequence information in the data field synchronization segment of a VSB DTV transmission, and timed latch circuitry for latching the indication for a period of time longer than at least one DTV data field, thereby to generate the output signal of the PN sequence presence detector.

BRIEF DESCRIPTION OF THE DRAWING

FIG. 3 is a block schematic diagram showing in greater detail the circuitry used in FIG. 1 and in FIG. 2 for synchrodyning QAM DTV signal to baseband in the digital regime.

FIG. 4 is a block schematic diagram showing in greater detail the circuitry used in FIG. 1 and in FIG. 2 for synchrodyning VSB DTV signal to baseband in the digital regime.

DETAILED DESCRIPTION

Figure 1:
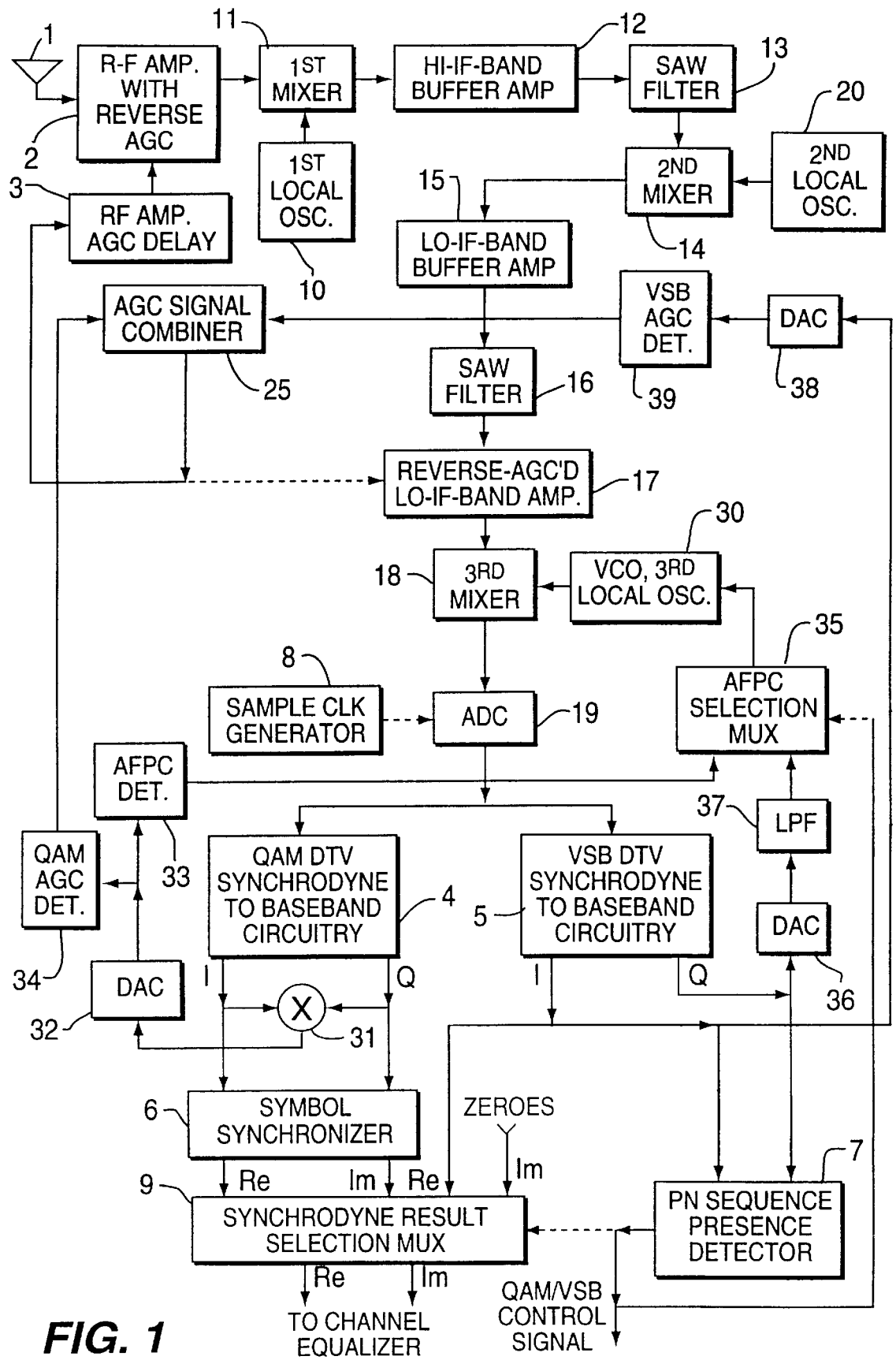
FIG. 1 is a block schematic diagram of the radio receiver portions of one type of DTV receiver modified to include the invention.

FIG. 1 shows the radio receiver portions of a DTV receiver constructed in accordance with the invention, which receiver is capable of receiving either QAM or VSB digital TV signals. An antenna 1 is a representative source of TV signals in ultra high frequency (UHF) band, or possibly in the very high frequency (VHF) band, which TV signals are applied to a radio-frequency (RF) amplifier 2. The RF amplifier 2 is provided with a tracking preselection filter for selecting a portion of the one of the television broadcast bands the television signal selected for reception reposes in. The RF amplifier 2 is reverse-AGC'd in delayed response to AGC signals applied to RF amplifier 2 via an AGC delay circuit 3. The RF amplifier 2 supplies amplified response to the television signal selected for reception.

This amplified response is mixed with a super-heterodyning signal from a first local oscillator 10 for upconversion to a high intermediate-frequency-band, which is above the highest frequency television channel in the ultra-high frequency (UHF) spectrum. In line with current TV practice, the first local oscillator 10 is usually a frequency synthesizer for generating the super-heterodyning signal of a frequency in selected ratio with the frequency of a component controlled oscillator, with the frequency of the controlled oscillator being controlled by AFT signal. This preferred practice results in the sensitivity of the super-heterodyning signal frequency to AFT signal being substantially the same for all received TV channels. The 6-MHz-wide selected radio-frequency signal supplied by the RF amplifier 2 is upconverted to a high-band intermediate-frequency signal in a first mixer 11, which preferably is of a doubly-balanced linear-multiplication type. The high-band intermediate-frequency signal is centered at an ultra-high frequency above that portion of the UHF band containing assigned channels for television broadcasting, placing the image frequencies well above 1 GHz so they are easily rejected by a bandpass coupling network at the output of the first mixer 11.

A high-intermediate-frequency-band buffer amplifier 12 applies the high-band IF signal to a surface-acoustic-wave (SAW) filter 13. The buffer amplifier 12 provides fixed gain to make up the 10–12 dB insertion loss of the SAW filter 13 and drives the SAW filter 13 from a fixed source impedance chosen to avoid unwanted reflections. The SAW filter 13 has a substantially linear-phase, flat-amplitude response that has −1 dB to −1 dB bandwidth of substantially 6 MHz, which passband is symmetrical around a midband frequency. By way of example, the UHF IF signal can be centered at 916 MHz. A gallium arsenide SAW filter 13 can be operated satisfactorily in this frequency range. The response of the SAW filter 13 is supplied to a second mixer 14 for down-conversion to a low-band intermediate-frequency signal centered at a very high frequency below that portion of the VHF band containing assigned channels for television broadcasting. The low-band IF signal can be centered at about 44 MHz, as common in analog TV practice. A local oscillator 20, which is preferably of a crystal-controlled type, supplies a heterodyning signal of stable fixed frequency to the second mixer 14 for implementing the down-conversion therein. The second mixer 14 is preferably of a doubly-balanced linear-multiplication type.

A low-intermediate-frequency-band buffer amplifier 15 applies the low-band IF signal to a surface-acoustic-wave (SAW) filter 16 designed for flat response over at least a 6 MHz bandwidth. The buffer amplifier 15 provides fixed gain to make up the 10–12 dB insertion loss of the SAW filter 16 and drives the SAW filter 16 from a fixed source impedance chosen to avoid unwanted reflections. The SAW filter 16 has a substantially linear-phase response over a bandwidth in excess of 6 MHz, so that the earlier SAW filter 13 determines the channel characteristics of the first IF amplifier chain. A lithium niobate SAW filter 16 can be operated satisfactorily in the frequency range centered at about 44 MHz. The response of the SAW filter 16 is supplied as input signals to automatic-gain-controlled low-intermediate-frequency-band (VHF) amplifier 17. The low-IF-band amplifier 17 supplies its response as input signal to a third mixer 18, which supplies a final intermediate-frequency signal for digitization by an analog-to-digital converter 19.

A voltage-controlled oscillator 30 supplies VHF oscillations to the third mixer 18 for heterodyning with low-IF-band amplifier 17 response to generate a final intermediate-frequency signal the lowest frequency of which is offset only a megaHertz or so from zero frequency. This final IF signal is supplied to digital synchrodyne circuitry 4, which synchronously detects in-phase (I) QAM carrier wave modulation and synchronously detects quadrature-phase (Q) QAM carrier wave modulation, and to digital synchrodyne circuitry 5, which synchronously detects in-phase (I) VSB carrier wave modulation and synchronously detects quadraturephase (Q) VSB carrier wave modulation. The VCO 30 is supplied automatic frequency and phase control (AFPC) signal from an AFPC selection multiplexer 35, the operation of which will be explained in detail further on in this specification.

The digital synchrodyne circuitry 4 is designed for responding to QAM DTV signal in the final intermediate-frequency signal to recover respective in-phase (I) and quadrature-phase (Q) baseband signals that are supplied to a symbol synchronizer 6 for conversion to real and imaginary baseband signals descriptive of QAM symbols. A digital multiplier 31, which in order to secure speedy operation is preferably implemented in read-only memory (ROM), multiplies these I and Q baseband signals together. The resulting product which contains samples descriptive of a low frequency beat term and of a term at symbol rate is converted to analog form by a digital-to-analog converter 32. The DAC 32 response is supplied to an automatic-frequency-and-phase-control detector 33, and the AFPC detector 33 response is supplied to the AFPC selection multiplexer 35 as a first input signal thereof. When the DTV signal receiver is conditioned for QAM reception, the AFPC selection multiplexer 35 forwards AFPC signal from the AFPC detector 33 to the VCO 30, for adjusting the frequency and phase of the VCO 30 to reduce the low frequency beat term in the DAC 32 response to zero frequency. This feedback control of the voltage-controlled third local oscillator 30 is a species of Costas loop.

A QAM automatic-gain-control detector 34 responds to the DAC 32 response to generate a first input signal for an AGC signal combiner 25, which applies an automatic-gain-control (AGC) signal to the low-IF-band amplifier 17. In order better to preserve linearity of the QAM digital modulation in the low-IF-band amplifier 17 response, reverse AGC is employed with this amplifier.

The digital synchrodyne circuitry 5 is designed for responding to VSB DTV signal in the final intermediate-frequency signal to recover respective in-phase (I) and quadrature-phase (Q) baseband signals, at the least the former of which baseband signals is descriptive of VSB AM symbols. The quadrature-phase baseband signal from the synchrodyne circuitry 5 is converted to analog form by a digital-to-analog converter 36, and a lowpass filter 37 extracts a low-frequency beat term from the DAC 36 response for application to the AFPC selection multiplexer 35 as a second input signal thereto. When the DTV signal receiver is conditioned for QAM reception, the AFPC selection multiplexer 35 forwards the lowpass filter 37 response to the VCO 30 as an AFPC signal, for adjusting the frequency and phase of the VCO 30 to reduce the low frequency beat term in the lowpass filter 37 response to zero.

The in-phase baseband signal from the synchrodyne circuitry 5 is converted to analog form by a digital-to-analog converter 38, and a VSB automatic-gain-control detector 34 responds to the DAC 38 response to generate a second input signal for the AGC signal combiner 25. Supposedly only one of the respective responses from the AGC detectors 34 and 39 will indicate need for reducing radio receiver gain, so the AGC signal combiner 25 can be configured to act as an analog OR circuit for those responses, developing AGC signals responsive only to that one of the respective responses from the AGC detectors 34 and 39 which most indicates need for reducing radio receiver gain. The AGC signal combiner 25 supplies AGC signal to the low-IF-band amplifier 17 and also forwards AGC signal to the AGC delay circuit 3 for reducing the gain of the RF amplifier 2 when very strong signal reception obtains.

The in-phase (I) and quadrature-phase (Q) baseband signals from the digital synchrodyne circuitry 5 are supplied to a PN sequence presence detector 7. The PN sequence presence detector 7 may be of a type for sensing the PN63 sequences transmitted during field sync data segments in a received VSB DTV signal. However, the PN sequence presence detector 7 preferably is of a type for sensing the PN511 sequences transmitted during those field sync data segments, and the operation of the FIG. 1 apparatus will be described presuming such PN sequence presence detector 7 being used. The PN sequence presence detector 7 supplies indications of the absence or presence of the PN511 sequences transmitted during field sync data segments in a received VSB DTV signal, thereby to provide a QAM/VSB reception control signal used as control signal by a synchrodyne result selection multiplexer 9 and by the AFPC selection multiplexer 35.

Responsive to the PN sequence presence detector 7 indicating the absence of PN511 sequences, the DTV signal receiver is conditioned for operation in a QAM reception mode. In the QAM reception mode the synchrodyne result selection multiplexer 9 is conditioned to forward the real and imaginary baseband signals from the symbol synchronizer 6 to an amplitude-and-group-delay equalizer 90 shown in FIG. 5, and the AFPC selection multiplexer 35 is conditioned to forward the AFPC detector 33 response to the VCO 30 as its AFPC signal.

Responsive to the PN sequence presence detector 7 indicating the presence of PN511 sequences, the DTV signal receiver is conditioned for operation in a VSB reception mode. In the VSB reception mode the synchrodyne result selection multiplexer 9 selects the in-phase baseband signal from the digital synchrodyne circuitry 5 to be forwarded to the amplitude-and-group-delay equalizer 90 as real baseband signal, and selects arithmetic zeroes to be forwarded to the amplitude-and-group-delay equalizer 90 as imaginary baseband signal. These arithmetic zeros are referred to the baseline direct value of the real samples. In the VSB reception mode the AFPC selection multiplexer 35 is conditioned to forward the lowpass filter 37 response to the VCO 30 as its AFPC signal.

Figure 2:
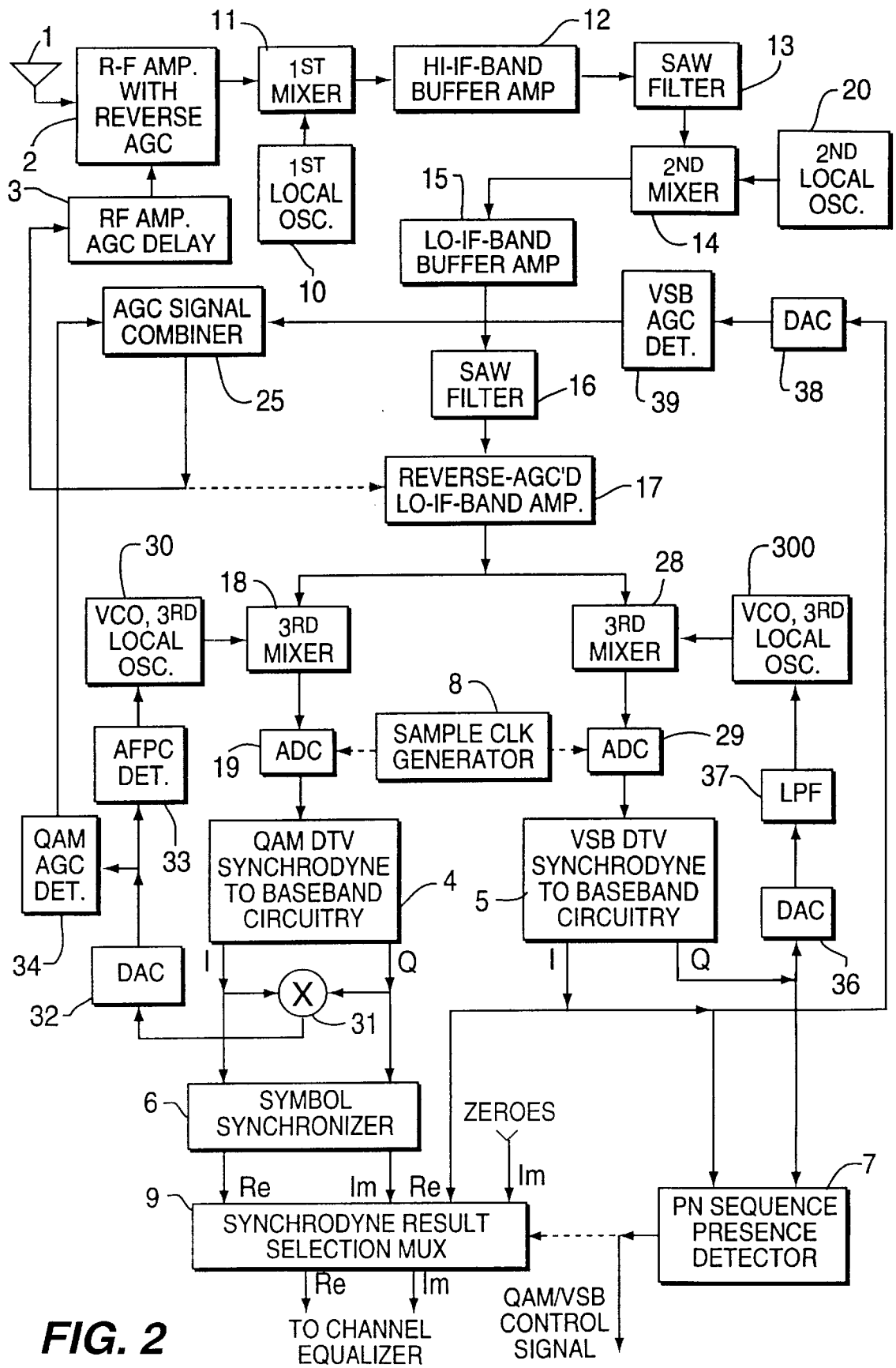
FIG. 2 is a block schematic diagram of the radio receiver portions of another type of DTV receiver modified to include the invention.

FIG. 2 shows a DTV signal receiver that differs from that shown in FIG. 1 in the following respects. While the digital synchrodyne circuitry 4 receives digitized final IF signal from the ADC 19 responsive to final IF signal generated by the third mixer 18, the digital synchrodyne circuitry 5 does not in the FIG. 2 DTV signal receiver. Instead, another third mixer 28 supplies final IF signal responsive to the low-IF-band amplifier 17 response, which final IF signal is digitized by an analog-to-digital converter 29 for application to the digital synchrodyne circuitry 5. The AFPC selection multiplexer 35 is dispensed with, and the AFPC detector 33 supplies AFPC signal to the VCO 30 in the FIG. 2 DTV receiver, when the receiver is conditioned to be operated in its VSB DTV reception mode as well as when the receiver is conditioned to be operated in its QAM DTV reception mode. The third mixer 28 receives VHF oscillations from a voltage-controlled oscillator 300 for heterodyning with low-IF-band amplifier 17 response to generate the final IF signal digitized by the DAC 29. The lowpass filter 37 response is applied to the VCO 300 as an AFPC signal, no matter whether the receiver is conditioned to be operated in its VSB DTV reception mode or in its QAM DTV reception mode.

FIG. 3 shows in more detail the digital circuitry 4 for synchrodyning QAM DTV signals to baseband. The QAM synchrodyning circuitry 4 includes the QAM in-phase synchronous detector 40 for generating the real portion of its output signal and the QAM quadrature-phase synchronous detector 45 for generating the imaginary portion of its output signal. The QAM synchrodyning circuitry 4 is essentially a complex digital multiplier which multiplies a real-to-complex sample converter 48 response to the digital samples from the ADC 19 by a complex digital samples of QAM carrier wave read from a read-only memory 49. The QAM synchrodyning circuitry 4 includes a digital adder 46, a digital subtractor 47, and respective first, second, third and fourth digital multipliers 41–44. The QAM in-phase synchronous detector 40 includes the multiplier 41, the multiplier 42, and the adder 46 for adding the product output signals of the multipliers 41 and 42 to generate the real portion of the output signal of the QAM synchrodyning circuitry 4. The first digital multiplier 41 multiplies the real digital samples of final IF signal supplied from the real-to-complex-sample converter 48 by digital samples descriptive of the cosine of the QAM carrier that are read from a look-up table 491 in the ROM 49, and the second digital multiplier 42 multiplies the imaginary digital samples of final IF signal supplied from the real-to-complex-sample converter 48 by digital samples descriptive of the sine of the QAM carrier that are read from a look-up table 492 in the ROM 49. The QAM quadrature-phase synchronous detector 45 includes the multiplier 43, the multiplier 44, and the subtractor 47 for subtracting the product output signal of the multiplier 43 from the product output signal of the multiplier 44 to generate the imaginary portion of the output signal of the QAM synchrodyning circuitry 4. The third digital multiplier 43 multiplies the real digital samples of final IF signal supplied from the real-to-complex-sample converter 48 by digital samples descriptive of the sine of the QAM carrier that are read from the look-up table 492 in the ROM 49, and the fourth digital multiplier 44 multiplies the imaginary digital samples of final IF signal supplied from the real-to-complex-sample converter 48 by digital samples descriptive of the cosine of the QAM carrier that are read from the look-up table 491 in the ROM 49.

FIG. 4 shows in more detail the digital circuitry 5 for synchrodyning VSB DTV signals to baseband. The VSB synchrodyning circuitry 5 includes the VSB in-phase synchronous detector 50 for generating the real portion of its output signal and the VSB quadrature-phase synchronous detector 55 for generating the imaginary portion of its output signal. The VSB synchrodyning circuitry 5 is essentially a complex digital multiplier which multiplies a real-to-complex sample converter 58 response to the digital samples from the ADC 29 by a complex digital samples of QAM carrier wave read from a read-only memory 59. The VSB synchrodyning circuitry 5 includes a digital adder 56, a digital subtractor 57, and respective first, second, third and fourth digital multipliers 51–54. The VSB in-phase synchronous detector 50 includes the multiplier 51, the multiplier 52, and the adder 56 for adding the product output signals of the multipliers 51 and 52 to generate the real portion of the output signal of the VSB synchrodyning circuitry 5. The first digital multiplier 51 multiplies the real digital samples of final IF signal supplied from the real-to-complex-sample converter 58 by digital samples descriptive of the cosine of the VSB carrier that are read from a look-up table 591 in the ROM 59, and the second digital multiplier 52 multiplies the imaginary digital samples of final IF signal supplied from the real-to-complex-sample converter 58 by digital samples descriptive of the sine of the VSB carrier that are read from a look-up table 592 in the ROM 59. The VSB quadrature-phase synchronous detector 55 includes the multiplier 53, the multiplier 54, and the subtractor 57 for subtracting the product output signal of the multiplier 53 from the product output signal of the multiplier 54 to generate the imaginary portion of the output signal of the VSB synchrodyning circuitry 5. The third digital multiplier 53 multiplies the real digital samples of final IF signal supplied from the real-to-complex-sample converter 58 by digital samples descriptive of the sine of the VSB carrier that are read from the look-up table 592 in the ROM 59, and the fourth digital multiplier 54 multiplies the imaginary digital samples of final IF signal supplied from the real-to-complex-sample converter 58 by digital samples descriptive of the cosine of the VSB carrier that are read from the look-up table 591 in the ROM 59.

The real-to-complex-sample converters 48 and 58 of FIGS. 3 and 4 can employ Hilbert transform generation filters and delay compensation circuitry as described by C.

B. Patel and the inventor in their U.S. Pat. No. 5,479,449 issued Dec. 26, 1995, entitled DIGITAL VSB DETECTOR WITH BANDPASS PHASE TRACKER, AS FOR INCLUSION IN AN HDTV RECEIVER, and incorporated herein by reference. Alternatively, the real-to-complex-sample converters 48 and 58 can employ Rader filters as described by C. B. Patel and the inventor in their U.S. Pat. No. 5,548,617 issued Oct. 20, 1996, entitled DIGITAL VSB DETECTOR WITH BANDPASS PHASE TRACKER USING RADER FILTERS, AS FOR USE IN AN HDTV RECEIVER, and incorporated herein by reference. Or, the real-to-complex-sample converters 48 and 58 can employ Ng filters as described by C. B. Patel and the inventor in their allowed U.S. patent application Ser. No. 08/577,469 filed Dec. 22, 1995, U.S. Pat. No. 5,731,848, entitled DIGITAL VSB DETECTOR WITH BANDPASS PHASE TRACKER USING NG FILTERS, AS FOR USE IN AN HDTV RECEIVER, and incorporated herein by reference. In preferred embodiments of the FIG. 1 DTV signal receiver the same real-to-complex-sample converter is the converter 48 of FIG. 3 in the digital synchrodyne circuitry 4 and is also the converter 58 of FIG. 4 in the digital synchrodyne circuitry 5.

Figure 5:
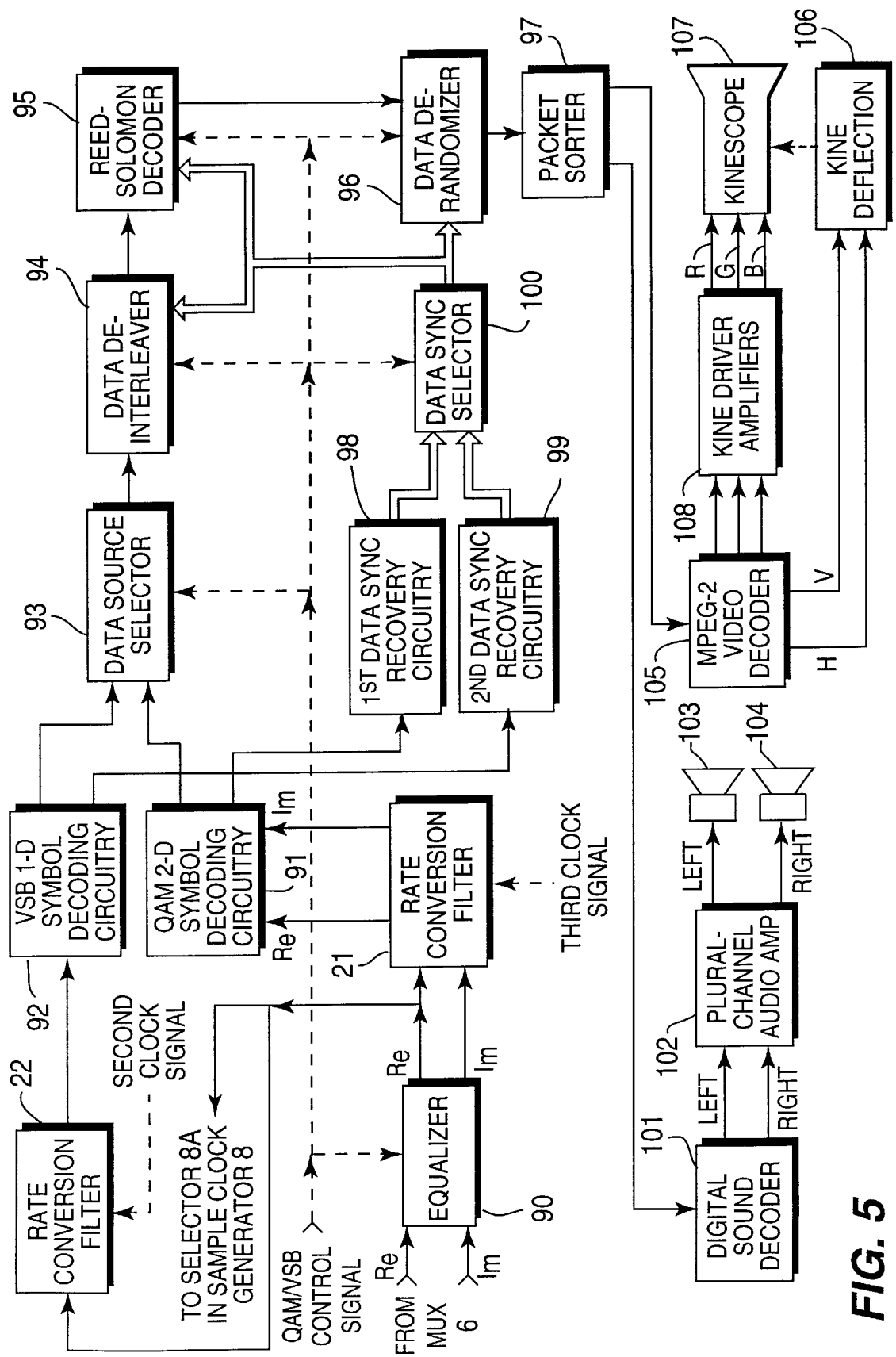
FIG. 5 is a block schematic diagram showing remaining portions of the DTV receivers radio receiver portions of which are shown in FIGS. 1 and 2.

FIG. 5 shows the amplitude-and-group-delay equalizer 90, which converts a baseband response with an amplitude-versus-frequency characteristic that tends to cause inter-symbol error to a more optimum amplitude-versus-frequency characteristic that minimizes the likelihood of inter-symbol error. The amplitude-and-group-delay equalizer 90 can be a suitable one of the monolithic ICs available off-the-shelf for use in equalizers. Such an IC includes a multiple-tap finite-impulse-response digital filter used for amplitude-and-group-delay equalization, the tap weights of which FIR filter are programmable; circuitry for selectively accumulating training signal and temporarily storing the accumulation results; and a microcomputer for comparing the temporarily stored accumulation results with an ideal training signal as known a priori and for calculating updated tap weights of the multiple-tap digital filter used for amplitude-and-group-delay equalization. Other configurations for the equalizer 90 separate the functions of ghost-cancellation and equalization to reduce the number of taps in the kernel of the filter used for final amplitude-and-group-delay equalization after ghost-cancellation is carried out by cascaded sparse-kernel filters of finite- and infinite-impulse response types.

The real response of the amplitude-and-group-delay equalizer 90 is supplied to circuitry in FIG. 6 that carries out symbol synchronization, as will be explained with reference to FIG. 6 further on in this specification. The real response of the equalizer 90 must be oversampled to facilitate symbol synchronization, and the imaginary response of the equalizer 90 is sampled at the same rate as its real response. A rate conversion filter 22 decimates the real response of the equalizer 90 to generate a $10.76*10^6$ samples per second response at the symbol rate for VSB, to be applied as input signal to one-dimensional symbol decoding circuitry 92, which performs the symbol decoding that recovers symbol-decoded digital data streams from a VSB DTV signal. A VSB DTV signal in accordance with the ATSC standard uses trellis coding of the data in all data segments except the initial data segment of each data field, which contains field synchronization code groups that are not subject to trellis coding. As in the prior art, one of the symbol-decoded digital data streams that the symbol decoding circuitry 92 supplies, which is to be employed for further data processing is generated by trellis-decoding the results of data-slicing procedures, and optimal Viterbi decoding techniques are customarily employed. As in the prior art, another of the symbol-decoded digital data streams that the symbol decoding circuitry 92 supplies, which is to be employed for controlling data handling by the receiver responsive to synchronization information contained in the received VSB DTV signal, is generated using data-slicing procedures without subsequent trellis decoding. The symbol decoding circuitry 92 preferably departs from usual prior-art practice by utilizing data-slicing techniques similar to those described in allowed U. S. patent application Ser. No. 08/839,691 filed Apr. 15, 1997, U.S. Pat. No. 5,835,131, entitled DIGITAL TELEVISION RECEIVER WITH ADAPTIVE FILTER CIRCUITRY FOR SUPPRESSING NTSC CO-CHANNEL INTERFERENCE, and incorporated herein by reference.

A rate conversion filter 21 decimates the real and imaginary responses of the equalizer 90 to generate a $5.38*10^6$ samples per second response at the symbol rate for QAM, to be applied as input signal to two-dimensional symbol decoding circuitry 91, which performs the symbol decoding that recovers symbol-decoded digital data streams from a QAM DTV signal. Presuming that the QAM DTV signal contains data synchronizing information corresponding with that in an ATSC VSB DTV signal, one of these symbol-decoded digital data streams is a trellis-decoded digital data stream supplied for further data processing, and another of these symbol-decoded digital data streams is generated by data-slicing without subsequent trellis decoding. This latter symbol-decoded digital data stream is employed for controlling data handling by the receiver responsive to synchronization information contained in the received QAM-origin signal.

A digital-signal multiplexer 93 functions as a data source selector that selects as its response either a first or a second one of two digital input signals thereto, the selection being controlled by the PN sequence presence detector 7. When the PN sequence presence detector 7 does not detect the PN511 sequences that accompany a VSB signal, the multiplexer 93 selectively responds to its first digital input signal, selecting as the source of its digital data output the two-dimensional symbol decoding circuitry 91 that decodes the symbols received in the QAM signal. When the PN sequence presence detector 7 detects the presence of the PN511 sequences that accompany a VSB signal, the multiplexer 93 selectively responds to its second digital input signal, selecting as the source of its digital data output the one-dimensional symbol decoding circuitry 92 that decodes the symbols received in the VSB signal.

The data selected by the data source selection multiplexer 93 are applied to a data de-interleaver 94 as its input signal, and the de-interleaved data supplied from the data de-interleaver 94 are applied to a Reed-Solomon decoder 95. The data de-interleaver 94 is often constructed within its own monolithic IC and is made so as to respond to the output indications from the PN sequence presence detector 7 to select the de-interleaving algorithm suitable to the DTV signal currently being received, whether it be of QAM or VSB type. The Reed-Solomon decoder 95 is often constructed within its own monolithic IC and is made so as to respond to the output indications from the PN sequence presence detector 7 to select the appropriate Reed-Solomon decoding algorithm for the DTV signal currently being received, whether it be of QAM or VSB type. Error-corrected data are supplied from the Reed-Solomon decoder 95 to a data de-randomizer 96, which responds to these data for regenerating a signal randomized prior to transmission to the DTV receiver, which regenerated signal comprises packets of data for a packet sorter 97. The data de-randomizer 96 is made so as to respond to the output indications from the PN sequence presence detector 7 to select the appropriate data de-randomizing algorithm for the DTV signal currently being received, whether it be of QAM or VSB type.

First data synchronization recovery circuitry 98 recovers the data synchronizing information included in the data output of the two-dimensional symbol decoding circuitry decoder 92, and second data synchronization recovery circuitry 99 recovers the data synchronizing information included in the data output of the one-dimensional symbol decoding circuitry 92. A data sync selector 100 selects between the data synchronizing information as provided by the data sync recovery circuitry 98 and as provided by the data sync recovery circuitry 99, the selection being controlled by the PN sequence presence detector 7 for detecting PN511 sequences in the real or imaginary samples from the VSB synchrodyne circuitry 5. When the PN511 sequences that accompany a VSB signal are not present, the data sync selector 100 selects for its output signals the data synchronizing information provided by the data sync recovery circuitry 98. When the PN511 sequences that accompany a VSB signal are present, the data sync selector 100 selects for its output signals the data synchronizing information provided by the data sync recovery circuitry 99.

When the data sync selector 100 selects for its output signals the data synchronizing information provided by the data sync recovery circuitry 99, the initial data lines of each data field are selected for application to the amplitude-and-group-delay equalizer 90 as training signal. The occurrence of a prescribed multiple-bit word is detected within the data sync recovery circuitry 99 to provide data-field indexing information to the data sync selector 100. The occurrences of the 511-sample PN sequence can be detected within the data sync recovery circuitry 99 to provide data-field indexing information to the data sync selector 100. Alternatively, the occurrences of two or three consecutive 63-sample PN sequences are detected within the data sync recovery circuitry 99 to provide data-field indexing information to the data sync selector 100.

The standards for a QAM DTV signal are not as well defined at this time as the standards for a VSB DTV signal. A 32-state QAM signal provides sufficient capacity for a single HDTV signal, without having to resort to compression techniques outside MPEG standards, but commonly some compression techniques outside MPEG standards are employed to encode the single HDTV signal as a 16-state QAM signal. The occurrence of a prescribed multiple-bit word is detected by the data sync recovery circuitry 98 to generate data-field indexing information for application to the data sync selector 100. A multiplexer within the data sync selector 100 selects between the data-field indexing information respectively supplied by the data sync recovery circuitry 98 and the data sync recovery circuitry 99; the data-field indexing information thus selected is supplied to the data de-interleaver 94, the Reed-Solomon decoder 95, and the data de-randomizer 96. At the time this specification is written there is no training signal included in the QAM DTV signal. Accordingly, in response to the PN sequence presence detector 7 indicating the absence of PN511 sequences in the received DTV signal, the amplitude-and-group-delay equalizer 90 is conditioned to use decision-directed equalization techniques that do not depend on a training signal; and the VSB training signal selected by the data sync recovery circuitry 99 is wired through the data sync selector 100 without need for a multiplexer. Also, there is no data line synchronization signal for QAM DTV transmission, at least not a data line synchronization signal selected as a standard. The data sync recovery circuitry 98 includes counting circuitry for counting the samples in each data field to generate intra-data-field synchronizing information. This intra-data-field synchronizing information and the intra-data-field synchronizing information (such as data line count) generated by the data sync recovery circuitry 98 are selected between by appropriate multiplexers in the data sync selector 100, for application to the data de-interleaver 94, the Reed-Solomon decoder 95, and the data de-randomizer 96, as required.

The packet sorter 97 sorts packets of data for different applications, responsive to header codes in the successive packets of data. Packets of data descriptive of the audio portions of the DTV program are applied by the packet sorter 97 to a digital sound decoder 101. The digital sound decoder 101 supplies left-channel and right-channel stereophonic sound signals to a plural-channel audio amplifier 102 that drives the plurality of loudspeakers 103, 104. Packets of data descriptive of the video portions of the DTV program are applied by the packet sorter 97 to an MPEG decoder 105, such as of MPEG-2 type. The MPEG decoder 105 supplies horizontal (H) and vertical (V) synchronizing signals to kinescope deflection circuitry 106 that provides for the raster scanning of the viewing screen of a kinescope 107. The MPEG decoder 105 also supplies signals to the kinescope driver amplifiers 108 for applying amplified red (R), green (G) and blue (B) drive signals to the kinescope 107. In variations of the DTV receiver shown in either of the FIGS. 1 or 2 together with FIG. 5, a different display device may be used instead of or in addition to the kinescope 107, and the sound recovery system may be different, consisting of but a single audio channel, or being more elaborate than a simple stereophonic reproduction system.

Figure 6:
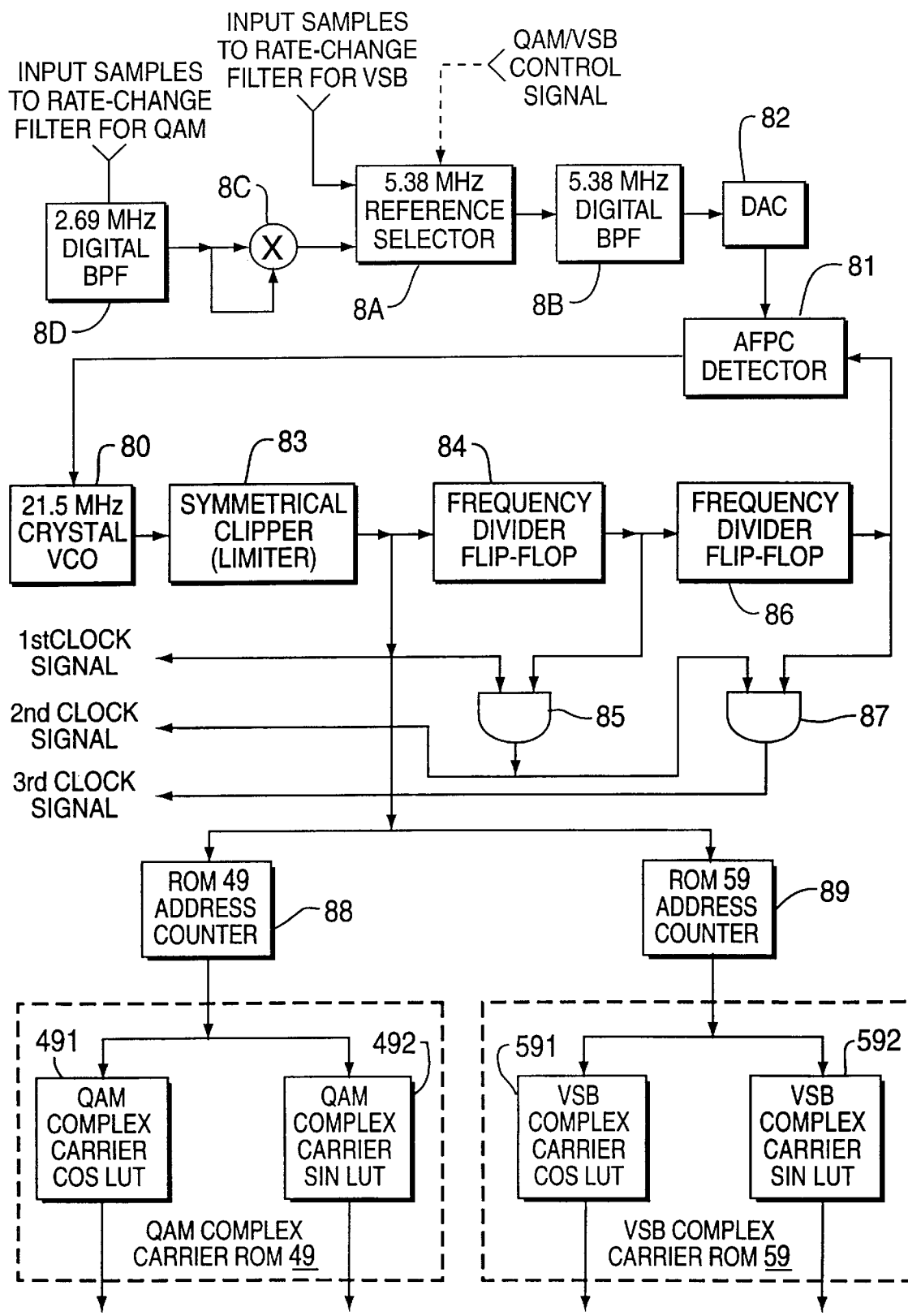
FIG. 6 is a detailed block schematic diagram of circuitry for providing the sample clock generator, the look-up table read-only memories (ROMS) for supplying digital descriptions of the complex carriers used for synchrodyning digital QAM signals and digital VSB signals at final IF signal frequencies each to baseband, and the address gene rat ors for those ROMs, which circuitry is included in certain DTV signal radio receivers of the types shown in FIGS. 1 and 2.

FIG. 6 shows in detail a representative construction of the sample clock generator 8 shown in FIG. 1. This construction includes a voltage-controlled oscillator 80 that generates cissoidal oscillations nominally of 21.52 MHz frequency. The oscillator 80 is a controlled oscillator, the frequency and phase of its oscillations being controlled by an automatic frequency and phase control (AFPC) signal voltage. This AFPC signal voltage is generated by an automatic frequency and phase control (AFPC) detector 81, which compares frequency-divided response to the oscillations of the oscillator 80 with a 5.38 MHz reference carrier supplied from a digital-to-analog converter (DAC) 82. Preferably, oscillator 80 is of a type using a crystal for stabilizing the natural frequency and phase of its oscillations. A symmetrical clipper or limiter 83 generates an essentially squarewave response to these cissoidal oscillations, which is used as the first clock signal for timing the sampling of the final IF signal in the ADC 19. A first frequency-divider flip-flop 84 responds to transitions of the first clock signal in a prescribed sense for generating another square wave with a fundamental frequency of 10.76 MHz, half the frequency of the oscillations of the oscillator 80. The frequency-divider flip-flop 84 supplies squarewave output signal with a fundamental frequency of 10.76 MHz to an AND circuit 85 to be ANDed with the first clock signal for generating a second clock signal used by the rate conversion filter 22 (shown in FIG. 5) for implementing 2:1 decimation. A second frequency-divider flip-flop 86 responds to transitions of the second clock signal in a prescribed sense for generating another square wave with a fundamental frequency of 5.38 MHz. This frequency-divided response to the oscillations of the oscillator 80 is supplied to the AFPC detector 81 for comparison with the 5.38 MHz reference carrier supplied from the DAC 82. This square wave with a fundamental frequency of 5.38 MHz e is also applied to an AND circuit 87 to be ANDed with the AND circuit 85 response for generating a third clock signal used by the rate conversion filter 21 (shown in FIG. 5) for implementing 4:1 decimation.

The frequency-divider flip-flop 84 supplies the count input to a sample counter 88, which generates addresses for the QAM complex carrier ROM 49 shown in FIGS. 3 and 6. The counter 88 counts to the value required to read a complete cycle of sine values and cosine values of the QAM complex carrier and then rolls over to its initial count value to continue counting samples.

The frequency-divider flip-flop 84 supplies the count input to a sample counter 89, which generates addresses for the VSB complex carrier ROM 59 shown in FIGS. 4 and 6. The counter 89 counts to the value required to read a complete cycle of sine values and cosine values of the VSB complex carrier and then rolls over to its initial count value to continue counting samples. In certain circumstances the counters 88 and 89 can share components or can even be the same counter.

The 5.38 MHz reference carrier supplied from the digital-to-analog converter 82 is generated by using a narrow bandpass filter for extracting a component of the received DTV signal as synchrodyned to baseband, which component is of a frequency that is a subharmonic of the symbol frequency (or baud frequency), and multiplying that subharmonic of the symbol frequency by an appropriate factor in frequency multiplier circuitry. More particularly, a digital multiplexer 8A responds to the PN sequence presence detector 7 (shown in FIGS. 1, 2 and 7) detecting PN511 sequences accompanying the received DTV signal, which is indicative that the received DTV signal is a VSB signal, to select the undecimated real samples of the equalizer 90 response for application to a bandpass FIR digital filter 8B that provides a selective response centered at 5.38 MHz to select the first subharmonic of symbol frequency from the VSB signal. The digital multiplexer 8A responds to the PN sequence presence detector 7 (shown in FIGS. 1, 2 and 7) not detecting PN511 sequences as accompany the received DTV signal, which is indicative that the received DTV signal is a QAM signal, to select the output signal of a squaring circuit 8C for application to the bandpass filter 8B that provides a selective response centered at 5.38 MHz. A bandpass FIR digital filter 8D that provides a selective response centered at 2.69 MHz for selecting the 2.69 MHz first subharmonic of the symbol frequency of a baseband QAM signal supplies input signal to the squaring circuit 8C, which generates harmonics of the filter 8D response including a strong 5.38 MHz component. This baseband QAM signal can be supplied either from the real samples of the equalizer 90 response, as shown in FIG. 6 or, alternatively, from the imaginary samples of the equalizer 90 response.

The squaring circuit 8C is shown in FIG. 6 as a digital multiplier receiving the filter 8D response both as multiplier and multiplicand. The squaring circuit 8C can be constructed from logic gates as a digital multiplier, but for the sake of speedier operation is better provided by a ROM storing a look-up table of squares. An absolute-value circuit can be used as a substitute for the squaring circuit in generating harmonics of the response of a preceding filter, but produces weaker second harmonics and so is not preferred.

Figure 7:
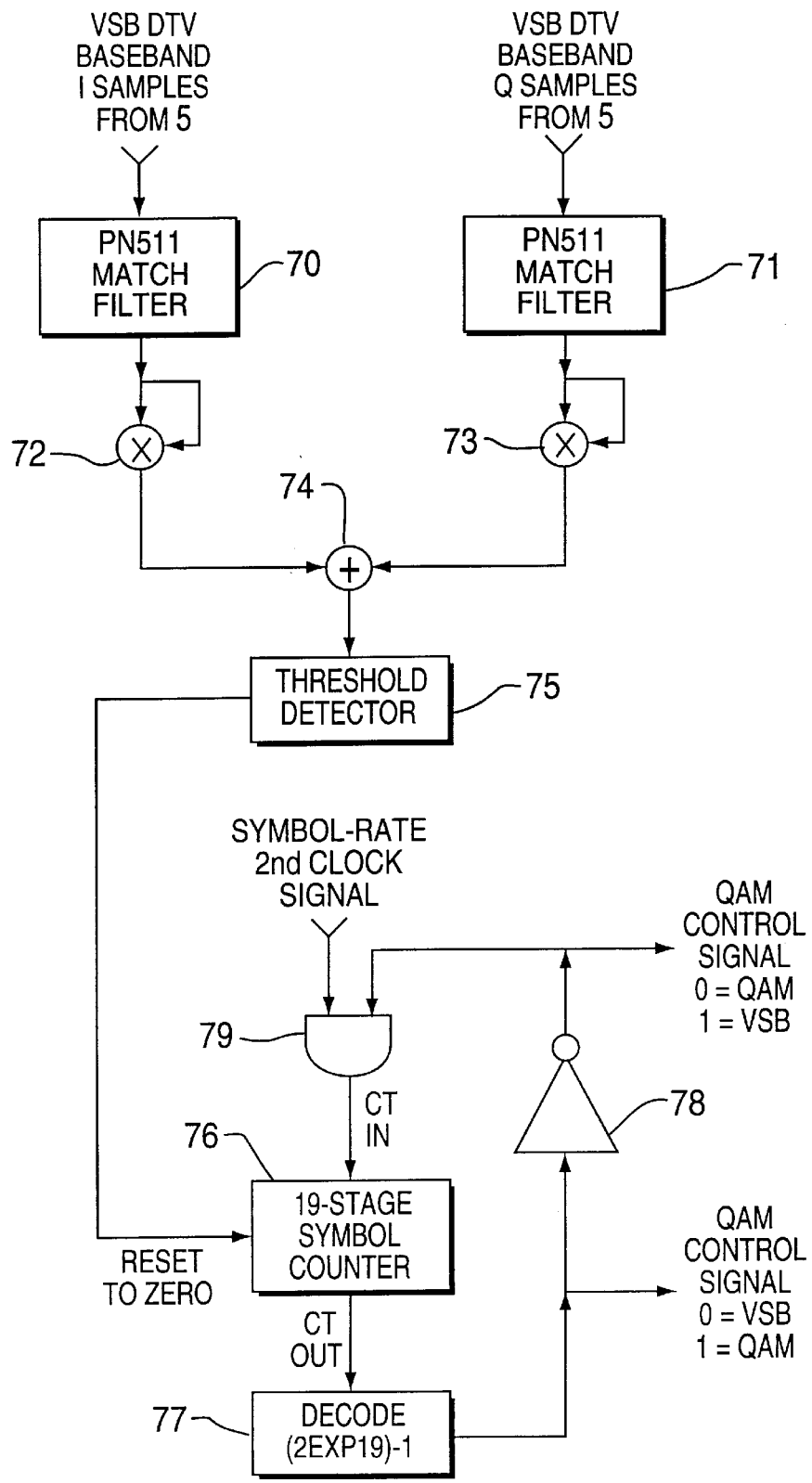
FIG. 7 is a detailed block schematic diagram of a PN511 sequence presence detector constructed in accordance with an aspect of the invention.

FIG. 7 shows in more detail a preferred construction of the PN sequence presence detector 7, which detects the presence of PN511 sequences in output signals from the digital synchrodyne circuitry 5. When the AFPC loop for controlling the digitized final IF signal supplied to the digital synchrodyne circuitry 5 is in proper frequency and phase lock, the imaginary sample stream from the digital synchrodyne circuitry 5 will consist of samples of null value except for noise, and the PN511 sequences will occur only in the real sample stream from the digital synchrodyne circuitry 5. When the AFPC loop for controlling the digitized final IF signal supplied to the digital synchrodyne circuitry 5 is not in proper phase lock, PN511 sequences will occur to some degree in the imaginary sample stream from the digital synchrodyne circuitry 5, and PN511 sequences will have diminished energy in the real sample stream from the digital synchrodyne circuitry 5. So, it is preferable to examine both the real and the imaginary sample streams from the digital synchrodyne circuitry 5 for the presence of PN511 sequences. The real and the imaginary sample streams from the digital synchrodyne circuitry 5 are accordingly supplied as input signals to respective match filters 70 and 71 for PN511 sequences.

In representative construction each of the match filters 70 and 71 includes a digital delay line having a sufficient number of stages to include one less than as many samples as required to describe 511 symbols; and the digital delay line is tapped at the input of its first stage and at the output of each of its stages. These taps are assigned +1 and −1 weights in a weighted summer, the weighting pattern being such as to provide match filtering for a PN511 sequence. The match filter 70 response is supplied to a squaring circuit 72, and the match filter 71 response is supplied to a squaring circuit 73 similar to the squaring circuit 72. The squaring circuits 71 and 72 can realized in logic circuitry or in read-only memory (ROM). The squared match filter responses from the squaring circuits 71 and 72 are added in a digital adder 74 to obtain a measure of the combined energy of PN511 sequence components in the real and the imaginary sample streams from the digital synchrodyne circuitry 5. A threshold detector 75 responds to the combined energy of PN511 sequence components in these real and the imaginary sample streams exceeding a threshold value to generate a pulse indicative of the occurrence of components of the PN511 sequence in one or both of the real and the imaginary sample streams from the digital synchrodyne circuitry 5. This indication must be latched for at least one data field so the DTV signal receiver will be kept in the VSB reception mode until such time as PN511 sequences are no longer detected each data field or so. The timed latch for performing this latching function can be constructed around a monostable, for example, or alternatively around a symbol counter as shown in FIG. 7.

In FIG. 7 each pulse the threshold detector 75 generates indicative of the occurrence of a PN511 sequence is used to reset a symbol counter 76 to an initial count value (zero). The symbol counter 76 counts occurrences of the second clock signal at symbol rate, as selectively applied to its count input, the counting being done for determining how long it has been since a PN511 sequence with appreciable energy was last detected. By way of example, the symbol counter 76 contains 19 binary stages to permit counting somewhat more than a data frame of symbols. The count output from the symbol counter 76 is supplied to a decoder 77 which decodes a count somewhat short of full count and somewhat more than the number of symbols per data frame, thereby to supply a ONE output rather than the ZERO output otherwise supplied. This decoded count should never be reached if a PN511 sequence is detected at least once per data frame to re-initialize the count output. The decoder 77 output signal provides a QAM/VSB control signal that is ONE when the DTV receiver is to be operated in the QAM reception mode and that is ZERO when the DTV receiver is to be operated in the VSB reception mode. The decoder 77 output signal is inverted by a logic inverter 78 to generate a complementary QAM/VSB control signal that is ZERO when the DTV receiver is to be operated in the QAM reception mode and that is ONE when the DTV receiver is to be operated in the VSB reception mode. One or both of these QAM/VSB control signals is supplied as output signal from the PN sequence presence detector 7.

The logic inverter 78 output signal and the second clock signal supplied at symbol rate are applied as first and second input signals to a two-input AND gate 79. If no PN511 sequence is detected for more than a data frame, so the decoder 77 output signal becomes a ONE, the logic inverter 78 generates an output signal that is ZERO. This conditions the AND gate 79 no longer to supply second clock signal to the symbol counter 76 for counting. The counter 76 output count remains at that value the decoder 77 output signal is a ONE, latching the logic inverter 78 output signal to be ZERO. The DTV signal receiver is conditioned to operate in the QAM reception mode responsive either to the decoder 77 output signal and logic inverter 78 input signal being a ONE, or to the logic inverter 78 output signal being ZERO.

The DTV signal receiver will continue to operate in the QAM reception mode until a PN511 sequence is again detected in the real and the imaginary sample streams from the digital synchrodyne circuitry 5, which re-initializes the counter 76. The decoder 77 output signal then becomes a ZERO, and the logic inverter 78 generates an output signal that is ONE. The DTV signal receiver is conditioned to operate in the VSB reception mode responsive either to the decoder 77 output signal and logic inverter 78 input signal being a ZERO, or to the logic inverter 78 output signal being ONE.

The skilled digital designer will by acquaintance with the foregoing specification be enabled readily to design variants of the FIG. 7 PN sequence presence detector 7 embodying the invention. For example, the squaring circuits 71 and 72 can be replaced by absolute-value circuits without affecting operation too much.

Figure 8:
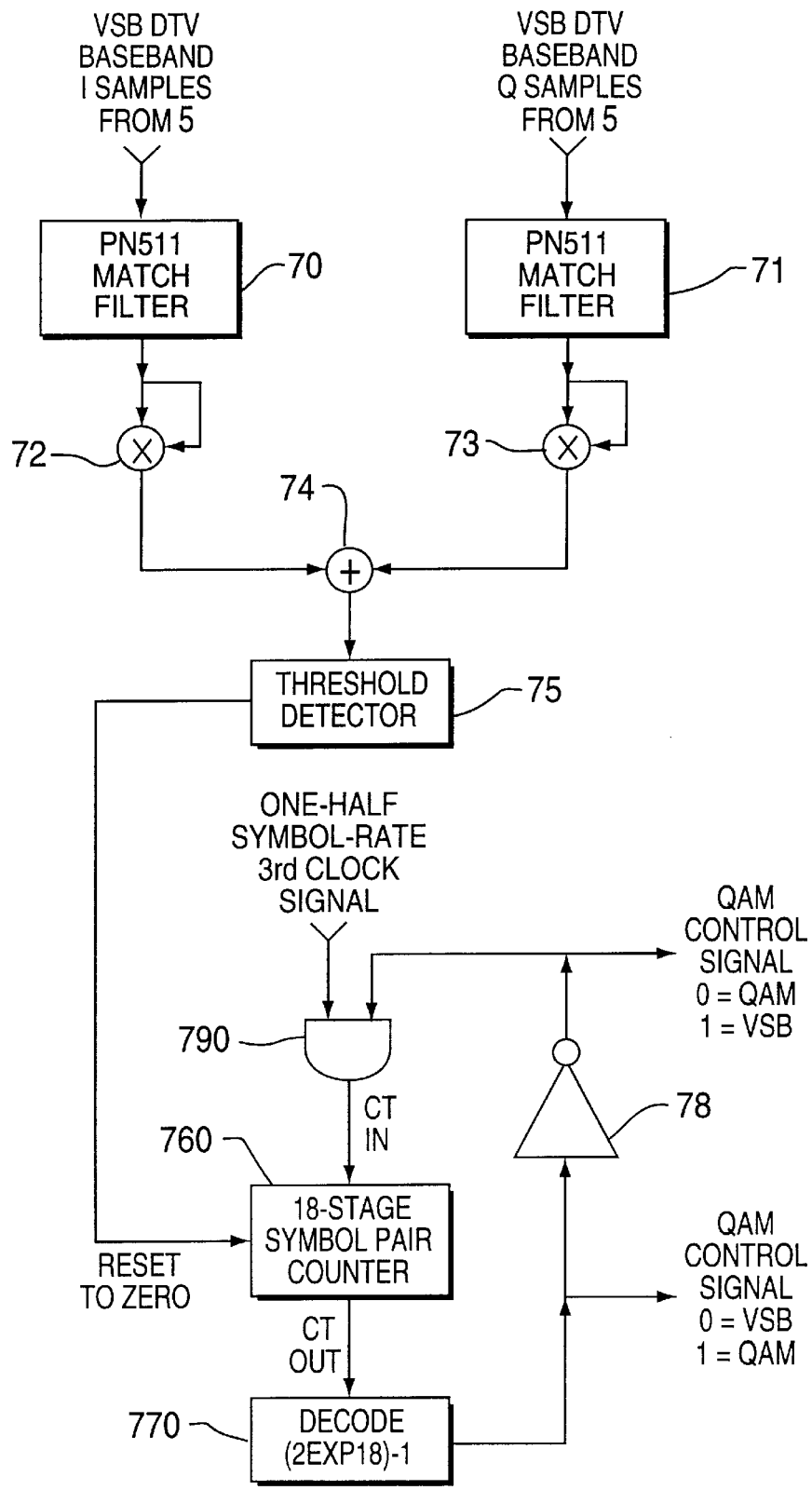
FIG. 8 is a detailed block schematic diagram of another PN511 sequence presence detector constructed in accordance with an aspect of the invention.

FIG. 8 shows a variant of the FIG. 7 PN sequence presence detector 7 in which the 19-stage symbol counter 76 is replaced by an 18-stage symbol-pair counter 760, the decoder 77 is replaced by a decoder 770 for decoding a count somewhat more than the number of symbol pairs in a data frame, and the AND circuit 79 for selectively supplying symbol-rate second clock pulses to be counted is replaced by an AND circuit 790 for selectively supplying half-symbol-rate third clock pulses to be counted.

Figure 9:
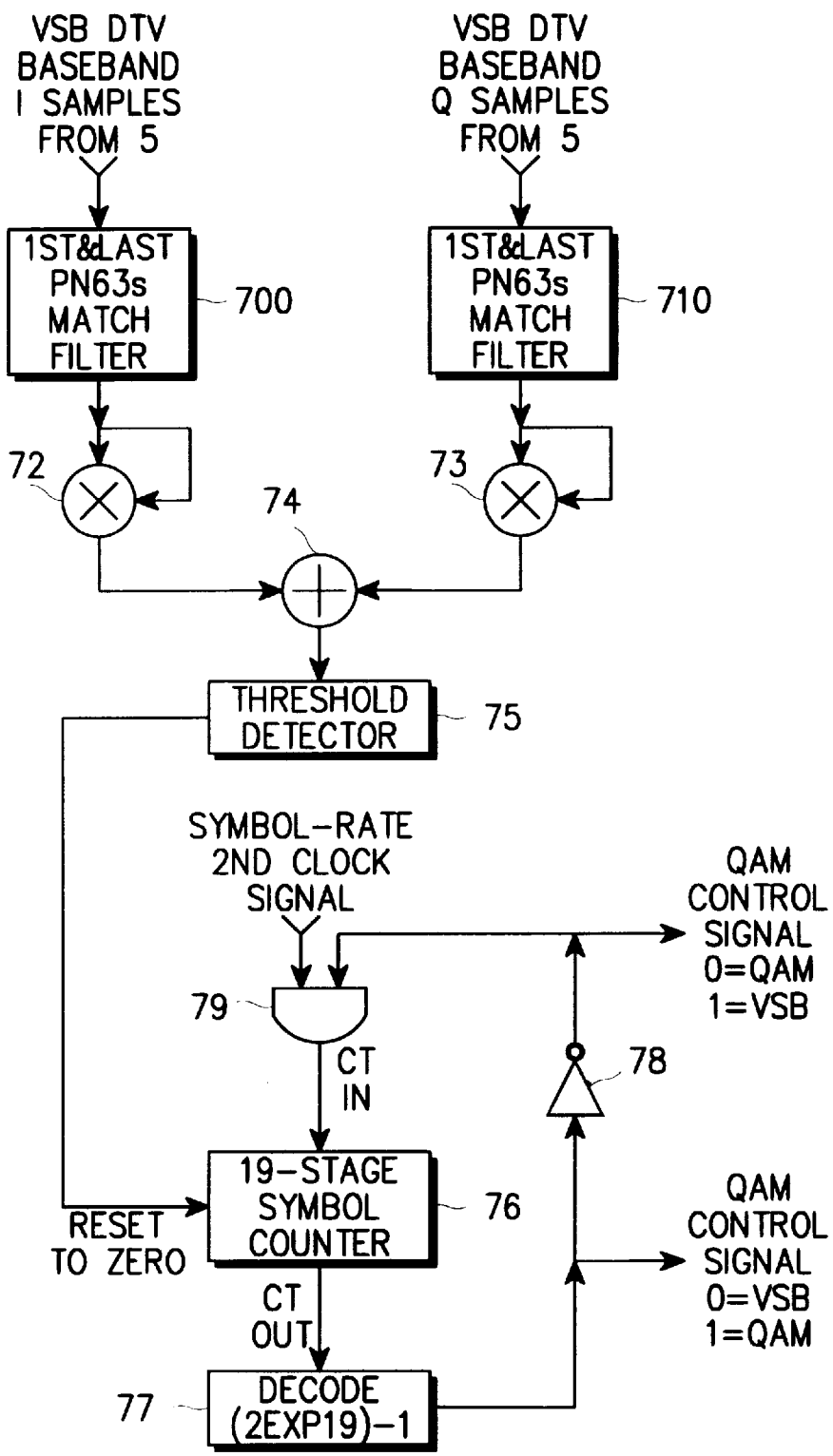
FIG. 9 is a detailed block schematic diagram of a PN63 sequence presence detector constructed in accordance with an aspect of the invention.

FIG. 9 shows a variant of the FIG. 7 PN sequence presence detector 7 in which the PN511 match filters 70 and 71 are replaced by match filters 700 and 710 providing match response to the initial and final PN63 sequences in the initial data segment of each data field in a VSB DTV baseband signal. In representative construction each of the match filters 700 and 710 includes a digital delay line having a sufficient number of stages to include one less than as many samples as required to describe 189 symbols; and the digital delay line is tapped at the input of its first stage, at the output of each of its initial stages as will hold one less than the number N of samples required to describe 63 symbols, and at the output of each of its final stages as will hold the number N of samples required to describe 63 symbols. These taps are assigned +1 and −1 weights in a weighted summer, the weighting pattern being such as to provide match filtering for the initial and final PN63 sequences in the initial data segment of each data field in a VSB DTV baseband signal.

Figure 10:
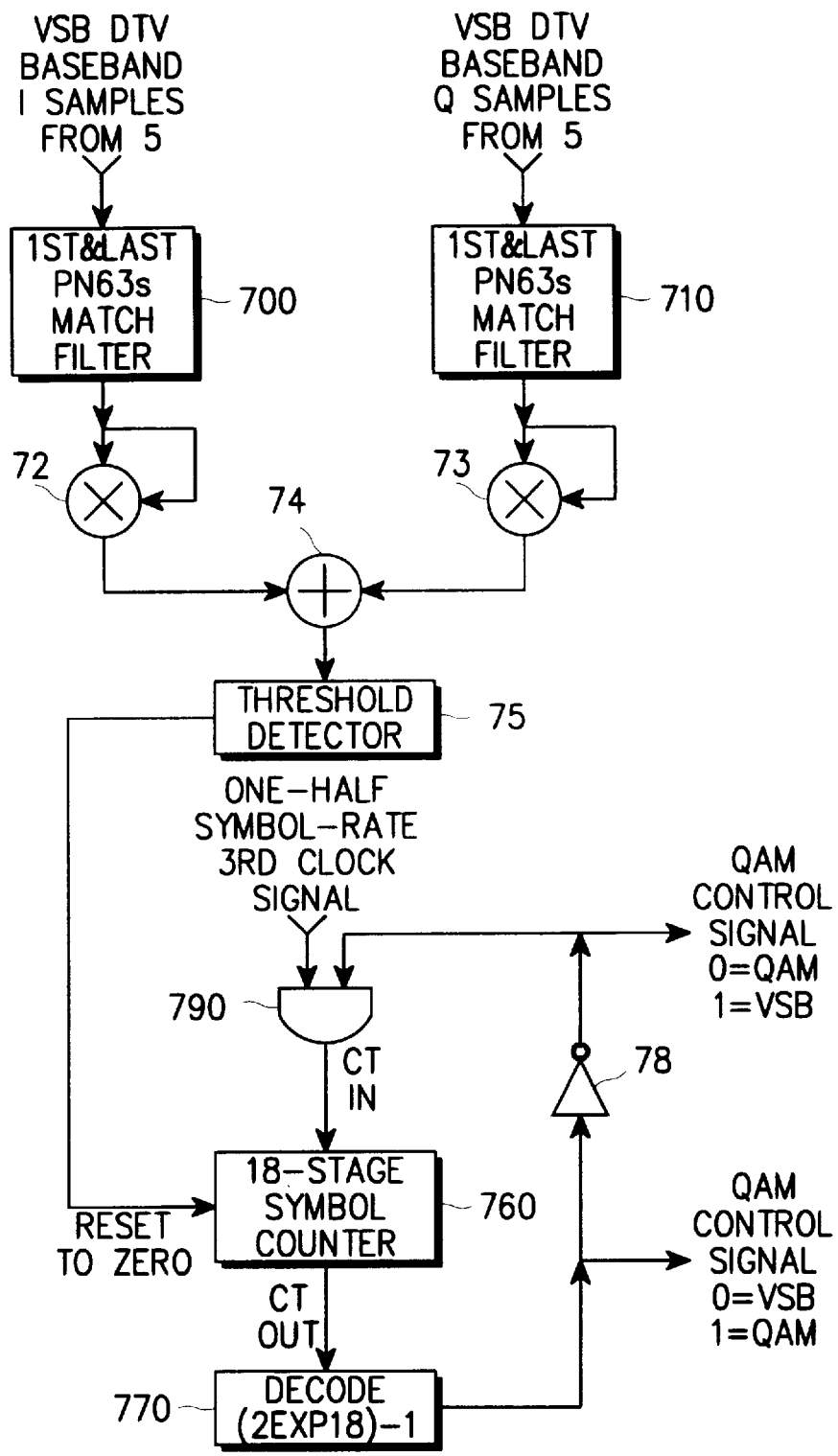
FIG. 10 is a detailed block schematic diagram of another PN63 sequence presence detector constructed in accordance with an aspect of the invention.

FIG. 10 shows a variant of the FIG. 9 PN sequence presence detector 7 in which the 19-stage symbol counter 76 is replaced by an 18-stage symbol-pair counter 760, the decoder 77 is replaced by a decoder 770 for decoding a count somewhat more than the number of symbol pairs in a data frame, and the AND circuit 79 for selectively supplying symbol-rate second clock pulses to be counted is replaced by an AND circuit 790 for selectively supplying half-symbol-rate third clock pulses to be counted.

Figure 11:
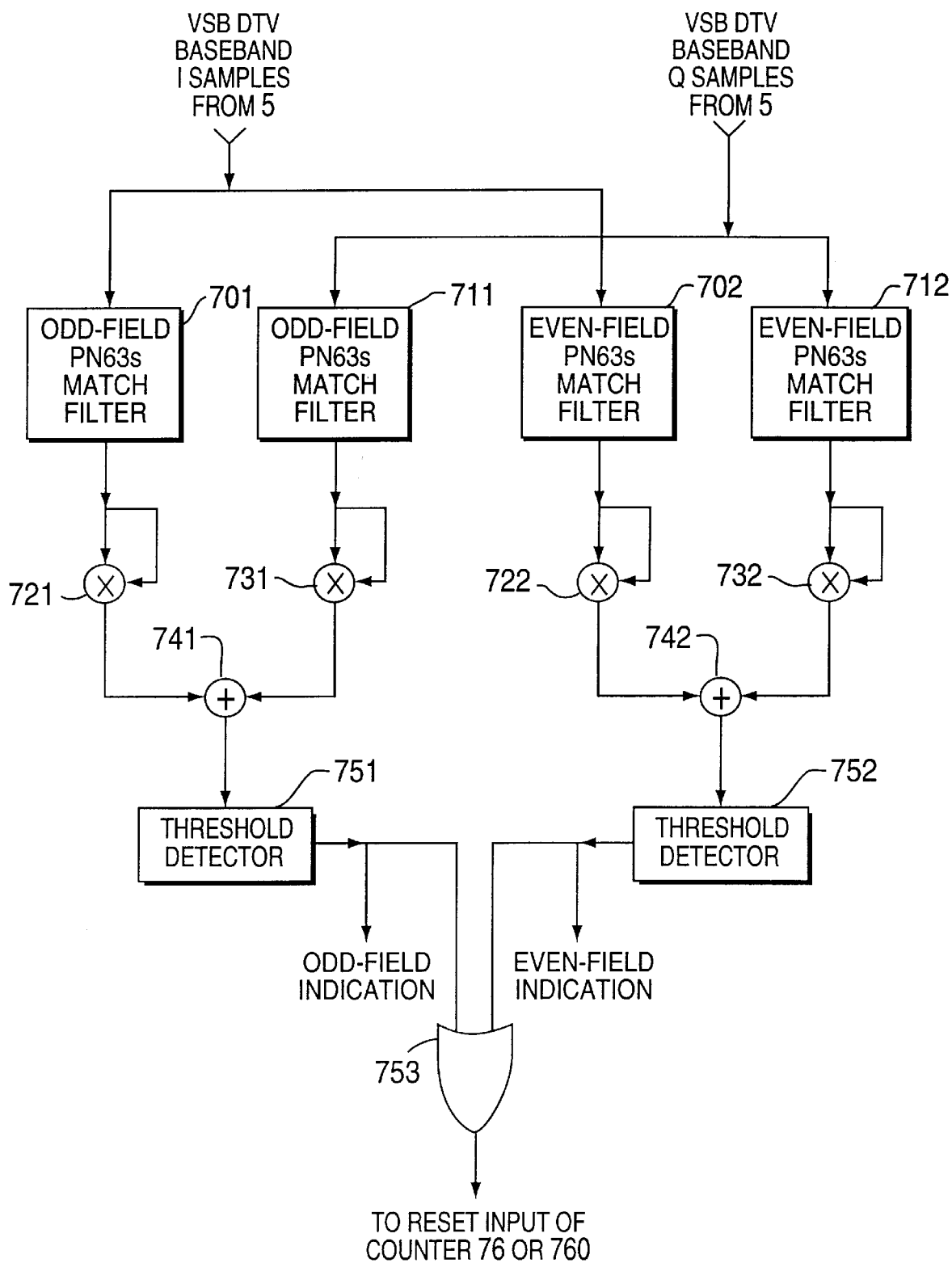
FIG. 11 is a detailed block schematic diagram of a modification that is made to the PN63 sequence presence detectors of FIGS. 9 and 10 in other PN63 sequence presence detectors constructed in accordance with aspects of the invention.

FIG. 11 shows a modification that can be made to the FIG. 9 PN sequence presence detector and to the FIG. 10 PN sequence presence detector, replacing the elements 700, 710, and 72–75 of FIGS. 9 and 10. The real and the imaginary sample streams from the digital synchrodyne circuitry 5 are supplied as input signals to respective match filters 701 and 711 for the triple PN63 sequence in odd data fields. In representative construction each of the match filters 701 and 711 includes a digital delay line having a sufficient number of stages to include one less than as many samples as required to describe 189 symbols; and the digital delay line is tapped at the input of its first stage and at the output of each of its stages. These taps are assigned +1 and −1 weights in a weighted summer, the weighting pattern being such as to provide match filtering for the triple PN63 sequence in the initial data segment of each odd data field in a VSB DTV baseband signal. The match filter 701 response is supplied to a squaring circuit 721, and the match filter 711 response is supplied to a squaring circuit 731 similar to the squaring circuit 721. The squared match filter responses from the squaring circuits 721 and 731 are added in a digital adder 741 to obtain a measure of the combined energy of components of the triple PN63 sequence in the initial data segment of each odd data field as they appear in the real and the imaginary sample streams from the digital synchrodyne circuitry 5. A threshold detector 751 responds to the combined energy of these components in these real and the imaginary sample streams exceeding a threshold value to generate a pulse that provides an indication of the occurrence of an odd-field initial data segment.

The real and the imaginary sample streams from the digital synchrodyne circuitry 5 are also supplied as input signals to respective match filters 702 and 712 for the triple PN63 sequence in even data fields. In representative construction each of the match filters 702 and 712 includes a digital delay line having a sufficient number of stages to include one less than as many samples as required to describe 189 symbols; and the digital delay line is tapped at the input of its first stage and at the output of each of its stages. These taps are assigned +1 and −1 weights in a weighted summer, the weighting pattern being such as to provide match filtering for the triple PN63 sequence in the initial data segment of each even data field in a VSB DTV baseband signal. The match filter 702 response is supplied to a squaring circuit 722, and the match filter 712 response is supplied to a squaring circuit 732 similar to the squaring circuit 722. The squared match filter responses from the squaring circuits 722 and 732 are added in a digital adder 742 to obtain a measure of the combined energy of components of the triple PN63 sequence in the initial data segment of each even data field as they appear in the real and the imaginary sample streams from the digital synchrodyne circuitry 5. A threshold detector 752 responds to the combined energy of these components in these real and the imaginary sample streams exceeding a threshold value to generate a pulse that provides an indication of the occurrence of an even-field initial data segment.

Responsive either to a pulse that provides an indication of the occurrence of an odd-field initial data segment or to a pulse that provides an indication of the occurrence of an even-field initial data segment, an OR gate 753 resets the counter 76 of a FIG. 9 PN sequence presence detector modified per FIG. 11 or the counter 760 of a FIG. 10 PN sequence presence detector modified per FIG. 11.

In still other embodiments of the invention a PN sequence presence detector as described above can be used in a television signal radio receiver for receiving both NTSC analog TV signals and VSB DTV signals for controlling the mode of reception.

In still further embodiments of the invention a PN sequence presence detector as described above can be used in a television signal radio receiver for receiving NTSC analog TV signals, VSB DTV signals and QAM DTV signals. The PN sequence presence detector is used to condition the television signal radio receiver for operating in the VSB DTV signal reception mode. The television signal radio receiver is conditioned for operating in the NTSC analog TV signal reception mode by detecting the presence of 4.5 MHz intercarrier signal in the sound circuitry of the NTSC portion of the television signal radio receiver, for example. If the television signal radio receiver is not conditioned for operating in the NTSC analog TV signal reception mode or for operating in the VSB DTV signal reception mode, then the television signal radio receiver is conditioned for operating in the QAM DTV signal reception mode as a default reception condition.

The term "television signal radio receiver" as used in the following claims is intended to apply not only to such receivers as used in connection with a television display device, but also to such receivers as otherwise used—for example, in a digital video cassette recorder.

What is claimed is:

1. A television signal radio receiver for selectively receiving vestigial-sideband (VSB) digital television (DTV) signals and television signals of at least one other type, each said VSB DTV signal having pseudo-random noise (PN) sequence information in the initial data segment of each successive one of the data fields thereof, said television signal radio receiver comprising:

circuitry for demodulating VSB DTV signals to generate a baseband signal;

a PN sequence presence detector responsive to said baseband signal for detecting the occurrence of said PN sequence information therein when a VSB DTV signal is being received, said PN sequence presence detector providing an output signal with an indication of each such occurrence which indication is sustained for a period of time at least as long as the duration of a data field; and circuitry, for operating the television signal radio receiver in a VSB DTV reception mode responsive to said PN sequence presence detector providing an output signal with an indication of the occurrence of said PN sequence information in said baseband signal, and for operating the television signal radio receiver in a reception mode for another type of television signal responsive to said PN sequence presence detector providing an output signal without indication of the occurrence of said PN sequence information in said baseband signal.

2. A television signal radio receiver as set forth in claim 1 wherein said PN sequence presence detector comprises:

match filter circuitry receptive of said baseband signal for providing match filter response to pseudo-random noise (PN) sequence information in the data field synchronization segment of a VSB DTV baseband signal;

a threshold detector for determining when the response of said match filter circuitry is of sufficient energy to provide a pulse indication of an occurrence in said baseband signal of the PN sequence information in the data field synchronization segment of a received VSB DTV transmission; and timed latch circuitry for latching the indication for a period of time longer than at least one II DTV data field, thereby to generate the output signal of said PN sequence presence detector.

3. A television signal radio receiver as set forth in claim 2, wherein said match filter circuitry is of a type responsive to PN511 sequence information.

4. A television signal radio receiver as set forth in claim 2, wherein said match filter circuitry is of a type responsive to PN63 sequence information.

5. A television signal radio receiver as set forth in claim 2, wherein said match filter circuitry is of a type responsive to PN sequence information comprising two PN63 sequences with prescribed differential time delay therebetween.

6. A television signal radio receiver as set forth in claim 5, wherein said prescribed differential time delay is equal to the duration of each of said two PN63 sequences.

7. A television signal radio receiver as set forth in claim 2, wherein said match filter circuitry is of a type responsive to triple PN63 sequence information.

8. A television signal radio receiver as set forth in claim 2, wherein said timed latch circuitry comprises:

an AND gate having an output connection for selectively passing clock signals applied to a first input connection of said AND gate responsive to a gating signal applied to a second input connection of said AND gate;

a counter with capability for supplying from an output port thereof a number an output count of said clock signals as occur in a time longer than the duration of a data field before reaching a final count, said counter receiving at a count input port said clock signals selectively passed from the output connection of said AND gate, said counter having a reset connection for receiving each said pulse indication from said threshold detector, the count supplied from the output port of said counter being reset to an initial value responsive to each said pulse indication received from said threshold detector;

a decoder for detecting the count supplied from the output port of said counter reaching said final count to generate a logic ONE at an output connection of said decoder and otherwise generating a logic ZERO at the output connection of said decoder; and a logic inverter with an input connection from the output connection of said decoder and with an output connection for supplying said gating signal to the second input connection of said AND gate, the output signal of said timed latch circuitry being taken from at least one of the input and output connections of said logic inverter.

9. A television signal radio receiver for selectively receiving vestigialsideband (VSB) digital television (DTV) signals and television signals of at least one other type, said television signal radio receiver comprising:

circuitry for demodulating VSB DTV signals to generate a first baseband signal;

respective circuitry for demodulating each said other type of television signal to generate a respective further baseband signal;

first and second match filters of similar type connected to receive as their respective input signals in-phase and quadrature-phase components of said first baseband signal, said first match filter for supplying a first match filter response to PN sequence information in the data field synchronization segment of a VSB DTV baseband signal as can appear in the in-phase component of said first baseband signal, and said second match filter for supplying a second match filter response to said PN sequence information in the data field synchronization segment of a VSB DTV baseband signal as can appear in the quadrature-phase component of said first baseband signal;

circuitry for determining the combined energy of said first match filter response and said second match filter response;

a threshold detector for determining when the combined energy of said first match filter response and said second match filter response is sufficient in energy to provide a pulse indication of an occurrence in said first baseband signal of the PN sequence information in the data field synchronization segment of a received VSB DTV transmission;

timed latch circuitry for latching the indication for a period of time longer than at least one DTV data field; and circuitry for operating the television signal radio receiver either in a VSB DTV reception mode or in a reception mode for another type of television signal, depending on an output signal of said timed latch circuitry.

10. A television signal radio receiver as set forth in claim 9, wherein said circuitry for determining the combined energy of said first match filter response and said second match filter response comprises:

first squaring circuitry for squaring said first match filter response;

second squaring circuitry for squaring said second match filter response; and an adder for summing the resulting squared first match filter response and squared second match filter response to generate a sum signal supplied to said threshold detector as input signal thereto.

11. A television signal radio receiver as set forth in claim 9, wherein said first and second match filters are each of a type responsive to PN511 sequence information.

12. A television signal radio receiver as set forth in claim 9, wherein said first and second match filters are each of a type responsive to PN63 sequence information.

13. A television signal radio receiver as set forth in claim 9, wherein said first and second match filters are each of a type responsive to PN sequence information comprising two PN63 sequences with prescribed differential time delay therebetween.

14. A television signal radio receiver as set forth in claim 13, wherein said prescribed differential time delay is equal to the duration of each of said two PN63 sequences.

15. A television signal radio receiver as set forth in claim 9, wherein said timed latch circuitry comprises:

an AND gate having an output connection for selectively passing clock signals applied to a first input connection of said AND gate responsive to a gating signal applied to a second input connection of said AND gate;

a counter with capability for supplying from an output port thereof a number an output count of said clock signals as occur in a time longer than the duration of a data field before reaching a final count, said counter receiving at a count input port said clock signals selectively passed from the output connection of said AND gate, said counter having a reset connection for receiving each said pulse indication from said threshold detector, the count supplied from the output port of said counter being reset to an initial value responsive to each said pulse indication received from said threshold detector;

a decoder for detecting the count supplied from the output port of said counter reaching said final count to generate a logic ONE at an output connection of said decoder and otherwise generating a logic ZERO at the output connection of said decoder; and a logic inverter with an input connection from the output connection of said decoder and with an output connection for supplying said gating signal to the second input connection of said AND gate, the output signal of said timed latch circuitry being taken from at least one of the input and output connections of said logic inverter.

16. A television signal radio receiver as set forth in claim 15, wherein said first and second match filters are each of a type responsive to PN511 sequence information.

17. A television signal radio receiver as set forth in claim 15, wherein said first and second match filters are each of a type responsive to PN sequence information comprising two PN63 sequences with prescribed differential time delay therebetween.

18. A television signal radio receiver as set forth in claim 17, wherein said prescribed differential time delay is equal to the duration of each of said two PN63 sequences.

19. A television signal radio receiver for selectively receiving vestigial-sideband (VSB) digital television (DTV) signals and television signals of at least one other type, said television signal radio receiver comprising:

circuitry for demodulating VSB DTV signals to generate a first baseband signal;

respective circuitry for demodulating each said other type of television signal to generate a respective further baseband signal;

first and second match filters of similar type connected to receive as their respective input signals in-phase and quadrature-phase components of said first baseband signal, said first match filter for supplying a first match filter response to triple PN63 sequence information in the odd data field synchronization segment of a VSB DTV baseband signal as can appear in the in-phase component of said first baseband signal, and said second match filter for supplying a second match filter response to said triple PN63 sequence information in the odd data field synchronization segment of a VSB DTV baseband signal as can appear in the quadrature-phase component of said first baseband signal;

circuitry for determining the combined energy of said first match filter response and said second match filter response;

a first threshold detector for determining when the combined energy of said first match filter response and said second match filter response is sufficient in energy to provide a pulse indication of an occurrence in said first baseband signal of the triple PN63 sequence information in the odd-data-field synchronization segment of a VSB DTV transmission;

third and fourth match filters of similar type connected to receive as their respective input signals said in-phase and quadrature-phase components of said first baseband signal, said third match filter for supplying a third match filter response to triple PN63 sequence information in the even data field synchronization segment of a VSB DTV baseband signal as can appear in the in-phase component of said first baseband signal, and said fourth match filter for supplying a fourth match filter response to said triple PN63 sequence information in the even data field synchronization segment of a VSB DTV baseband signal as can appear in the quadrature-phase component of said first baseband signal;

circuitry for determining the combined energy of said third match filter response and said fourth match filter response;

a second threshold detector for determining when the combined energy of said third match filter response and said fourth match filter response is sufficient in energy to provide a pulse indication of an occurrence in said first baseband signal of the triple PN63 sequence information in the even-data-field synchronization segment of a VSB DTV transmission;

an OR gate for supplying an OR gate response to each said pulse indication of an occurrence in said first baseband signal of the triple PN63 sequence information in the odd-data-field synchronization segment of a VSB DTV transmission and to each said pulse indication of an occurrence in said first baseband signal of the triple PN63 sequence information in the even-datafield synchronization segment of a VSB DTV transmission;

timed latch circuitry for latching the OR gate response for a period of time longer than at least one DTV data field; and circuitry for operating the television signal radio receiver either in a VSB DTV reception mode or in a reception mode for another type of television signal, depending on an output signal of said timed latch circuitry.

20. A television signal radio receiver as set forth in claim 19, wherein said timed latch circuitry comprises:

an AND gate having an output connection for selectively passing clock signals applied to a first input connection of said AND gate responsive to a gating signal applied to a second input connection of said AND gate;

a counter with capability for supplying from an output port thereof a number an output count of said clock signals as occur in a time longer than the duration of a data field before reaching a final count, said counter receiving at a count input port said clock signals selectively passed from the output connection of said AND gate, said counter having a reset connection for receiving said OR gate response, the count supplied from the output port of said counter being reset to an initial value responsive to each said pulse indication from said first or second threshold detector as repeated in said OR gate response;

a decoder for detecting the count supplied from the output port of said counter reaching said final count to generate a logic ONE at an output connection of said decoder and otherwise generating a logic ZERO at the output connection of said decoder; and a logic inverter with an input connection from the output connection of said decoder and with an output connection for supplying said gating signal to the second input connection of said AND gate, the output signal of said timed latch circuitry being taken from at least one of the input and output connections of said logic inverter.

21. A digital television receiver for signals that comprise multi-level symbols representing data and a field synchronizing signal, and for signals that comprise multi-level symbols representing data but do not include said field synchronizing signal, said digital television receiver comprising:

a detector for determining whether or not a received digital television signal is accompanied by said field synchronizing signal; and an adaptive equalizer having different operating modes for responding to said received digital television signal, the operating mode of said adaptive equalizer being selected responsive to the determination of whether or not said received digital television signal is accompanied by said field synchronizing signal.

* * * * *